(12) United States Patent
Yu

(10) Patent No.: US 12,511,464 B2
(45) Date of Patent: Dec. 30, 2025

(54) METHOD OF FABRICATING SEMICONDUCTOR DEVICE

(71) Applicant: SAMSUNG ELECTRONICS CO., LTD., Suwon-si (KR)

(72) Inventor: Jonghwan Yu, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 674 days.

(21) Appl. No.: 17/857,680

(22) Filed: Jul. 5, 2022

(65) Prior Publication Data

US 2023/0229842 A1    Jul. 20, 2023

(30) Foreign Application Priority Data

Dec. 30, 2021    (KR) .................. 10-2021-0193062

(51) Int. Cl.
*G06F 30/3953* (2020.01)
*G06F 30/39* (2020.01)
*G06F 30/394* (2020.01)
*G06F 30/398* (2020.01)

(52) U.S. Cl.
CPC .......... *G06F 30/3953* (2020.01); *G06F 30/39* (2020.01); *G06F 30/394* (2020.01); *G06F 30/398* (2020.01)

(58) Field of Classification Search
CPC ................................................. G06F 30/3953
USPC ......................................................... 716/126
See application file for complete search history.

(56) References Cited

U.S. PATENT DOCUMENTS

| | | | |
|---|---|---|---|
| 7,587,696 B2 | 9/2009 | Nakamoto | |
| 8,006,205 B2 | 8/2011 | Yoshioka | |
| 8,245,172 B2 | 8/2012 | Hsu | |
| 9,520,358 B2 | 12/2016 | Meng et al. | |
| 10,540,470 B1 | 1/2020 | Kollaritsch | |
| 10,936,784 B2 | 3/2021 | Pan et al. | |
| 2004/0255258 A1* | 12/2004 | Li | G06F 30/39 716/122 |
| 2010/0125821 A1 | 5/2010 | Tajima | |
| 2019/0122984 A1* | 4/2019 | Kim | H01L 23/5286 |

FOREIGN PATENT DOCUMENTS

KR    10-2019-0044481 A    4/2019

* cited by examiner

*Primary Examiner* — Eric D Lee
(74) *Attorney, Agent, or Firm* — Sughrue Mion, PLLC

(57) ABSTRACT

A method of fabricating a semiconductor device includes designing a layout of the semiconductor device, performing a routing step using a routing tool, performing an optical proximity correction (OPC) on the designed layout, and performing a photolithography process on a substrate using a photomask manufactured by the layout corrected by the OPC. Performing the routing step includes generating and storing an X×Y via structure in the routing tool, each of X and Y being an integer between 1 and 20, providing a low-level line and a high-level line, providing the X×Y via structure on a region where the low-level line and the high-level line overlap, and providing at least one routing line that passes through the X×Y via structure.

20 Claims, 20 Drawing Sheets

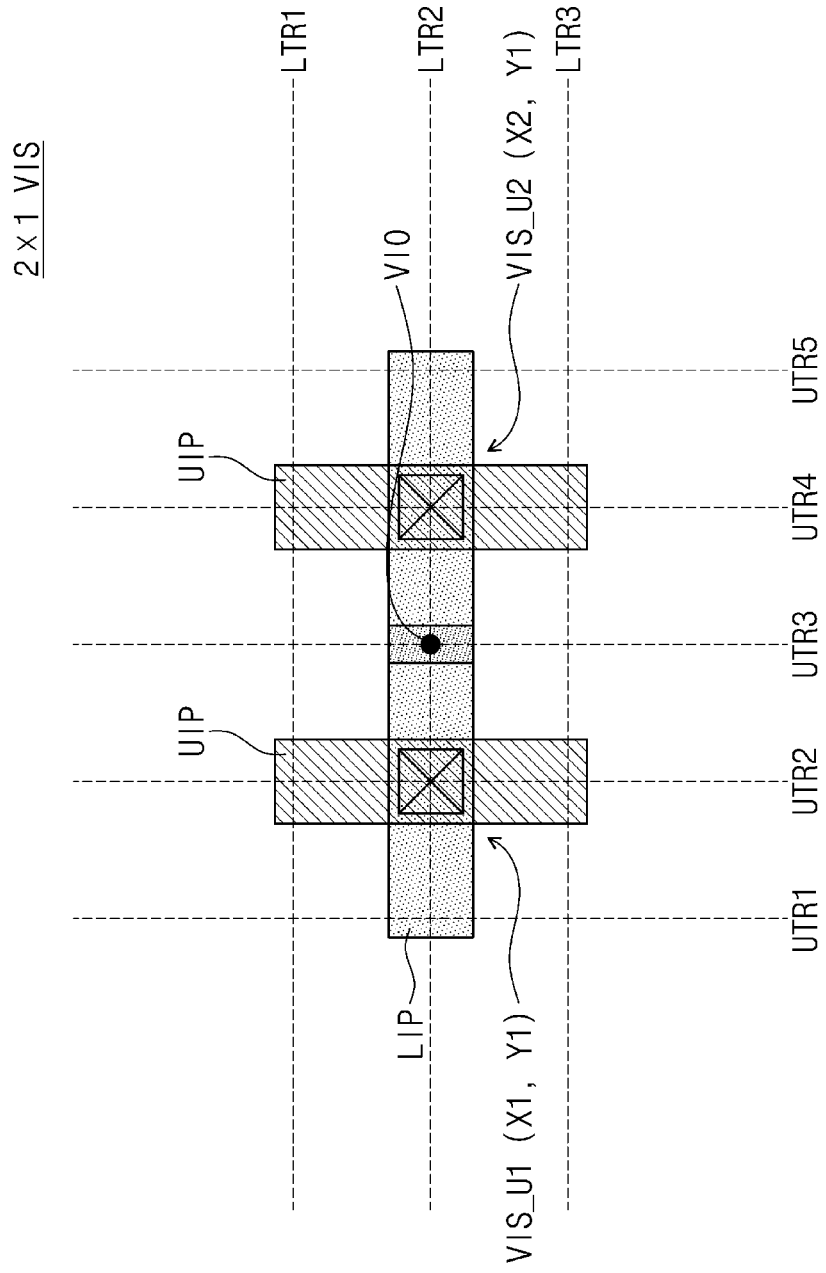

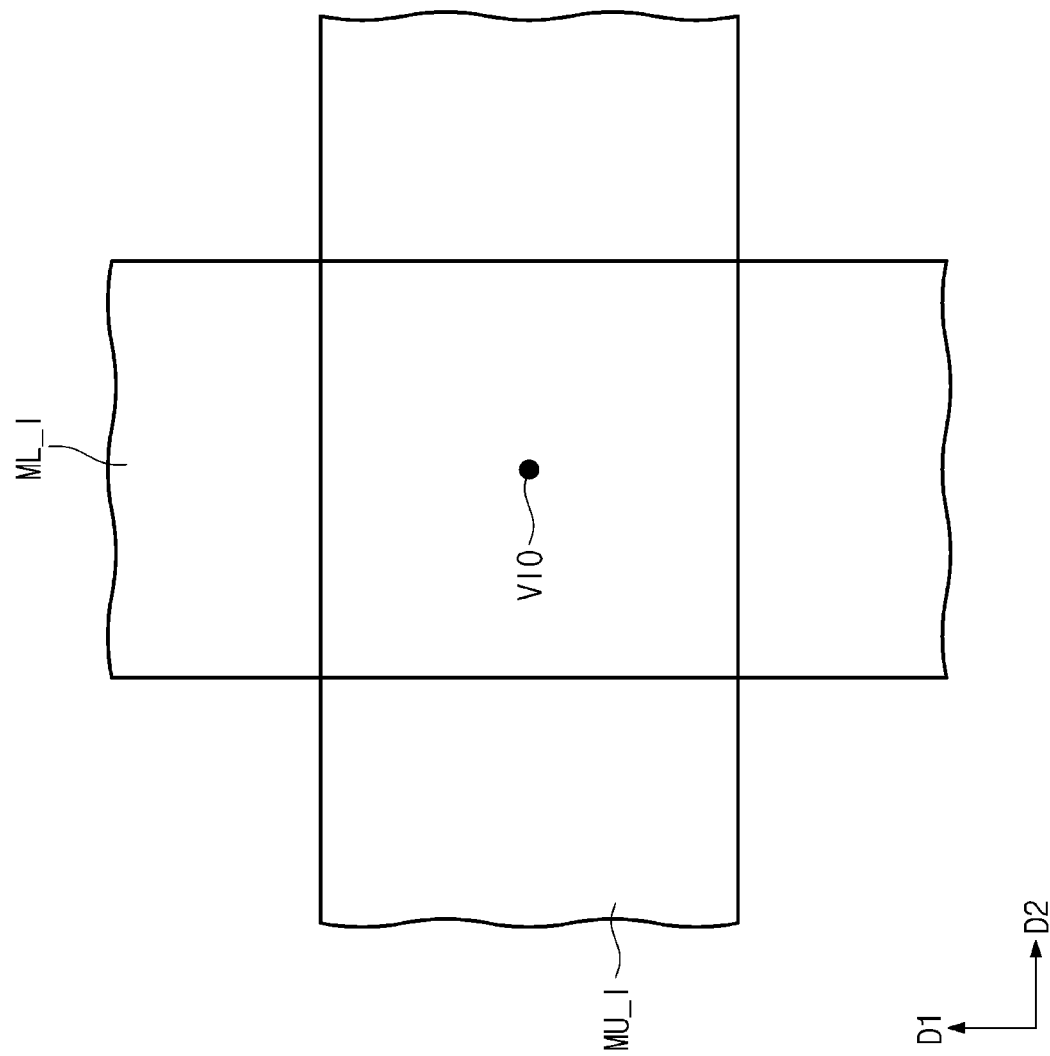

METHOD OF FABRICATING SEMICONDUCTOR DEVICE

CROSS-REFERENCE TO RELATED APPLICATION

This application is based on and claims priority from Korean Patent Application No. 10-2021-0193062 filed on Dec. 30, 2021 in the Korean Intellectual Property Office, the disclosure of which is incorporated herein in its entirety by reference.

BACKGROUND

1. Field

Example embodiments of the present disclosure relate to a method of fabricating a semiconductor device, and more particularly, to a method of fabricating a semiconductor device including a prompt and effective routing step.

2. Description of Related Art

Semiconductor devices are beneficial in the electronic industry because of their small size, multi-functionality, and/or low fabrication cost. The semiconductor devices may be categorized as any one of semiconductor memory devices storing logic data, semiconductor logic devices processing operations of logic data, and hybrid semiconductor devices having both memory and logic elements. A semiconductor device has been increasingly required for high integration with the advanced development of the electronic industry. For example, semiconductor devices have been increasingly requested for high reliability, high speed, and/or multi-functionality. Semiconductor devices are gradually becoming more complicated and more integrated to meet these requested characteristics.

SUMMARY

Provided is a method of fabricating a semiconductor device whose degree of routing freedom is increased and whose integration is high.

Additional aspects will be set forth in part in the description which follows and, in part, will be apparent from the description, or may be learned by practice of the presented embodiments.

According to an aspect of an example embodiment, a method of fabricating a semiconductor device may include designing a layout of the semiconductor device, performing a routing step using a routing tool, performing an optical proximity correction (OPC) on the designed layout, and performing a photolithography process on a substrate using a photomask manufactured by the layout corrected by the OPC. Performing the routing step may include generating and storing an X×Y via structure in the routing tool, each of X and Y being an integer between 1 and 20, providing a low-level line and a high-level line, providing the X×Y via structure on a region where the low-level line and the high-level line overlap, and providing at least one routing line that passes through the X×Y via structure.

According to an aspect of an example embodiment, a method of fabricating a semiconductor device may include designing a layout of the semiconductor device, performing a routing step using a routing tool, performing an OPC on the designed layout, and performing a photolithography process on a substrate using a photomask manufactured by the layout corrected by the OPC. Performing the routing step may include generating a unit via structure of 1×1 based on a technology file of the routing tool, generating an X×Y via structure by arranging a plurality of unit via structures in an X×Y matrix, each of X and Y being an integer between 1 and 20, storing the X×Y via structure in the routing tool, providing a low-level line and a high-level line, retrieving the X×Y via structure stored in the routing tool, providing the X×Y via structure on a region where the low-level line and the high-level line overlap.

According to an aspect of an example embodiment, a method of fabricating a semiconductor device may include designing a layout of the semiconductor device, performing an OPC on the designed layout, and performing a photolithography process on a substrate using a photomask manufactured by the layout corrected by the OPC. Designing the layout may include generating and storing an X×Y via structure in a routing tool, each of X and Y being an integer between 1 and 20, and performing a routing step using the routing tool. Generating the X×Y via structure may include generating a unit via structure of 1×1, arranging a plurality of unit via structures in an X×Y matrix, and emerging the unit via structures that are arranged in the X×Y matrix.

BRIEF DESCRIPTION OF DRAWINGS

The above and other aspects, features, and advantages of certain example embodiments of the present disclosure will be more apparent from the following description taken in conjunction with the accompanying drawings, in which:

FIGS. 12A, 12B, and 12C are plan views of a layout for various via structures formed using unit via structures according to an example embodiment.

FIGS. 13, 14 and 15 are plan views of a layout for explaining the routing step of FIG. 3 according to an example embodiment.

DETAILED DESCRIPTION

Figure 1:
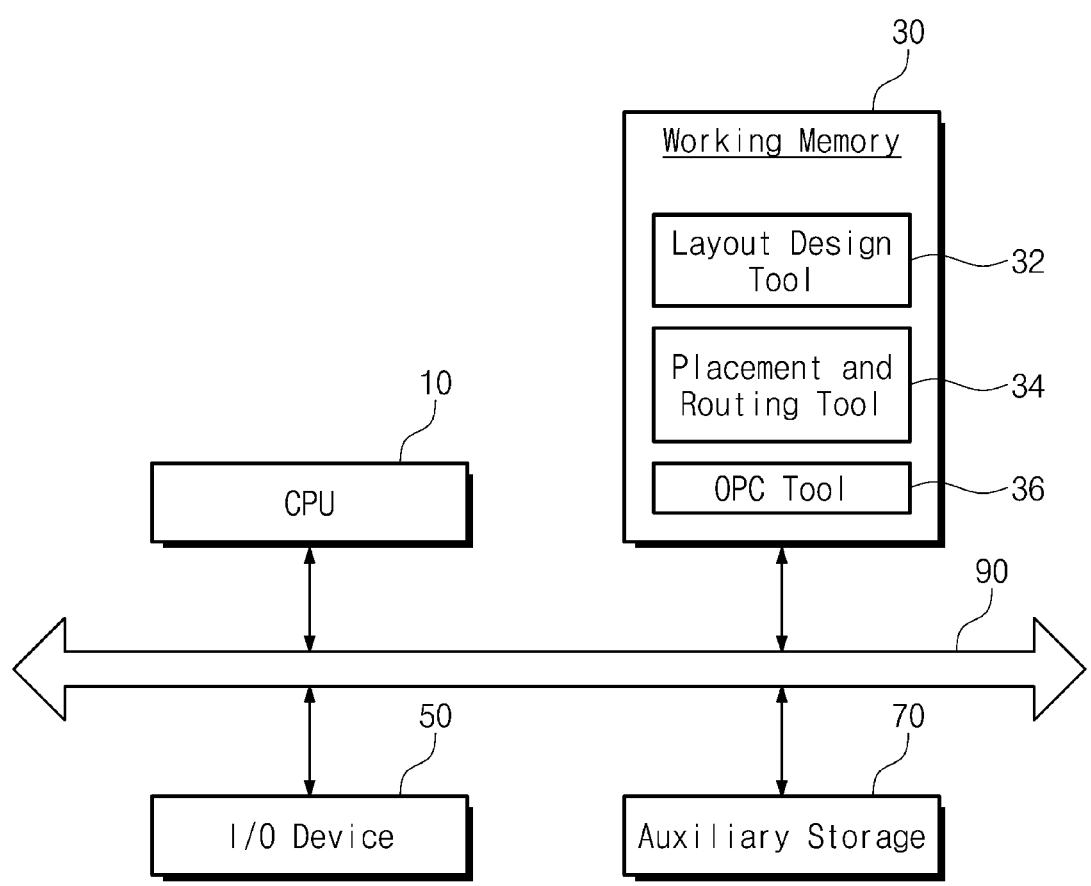
FIG. 1 illustrates a block diagram of a computer system for semiconductor design according to an example embodiment.

FIG. 1 illustrates a block diagram of a computer system for semiconductor design according to an example embodiment. Referring to FIG. 1, a computer system may include a central processing unit (CPU) 10, a working memory 30, an input/output (I/O) device 50, and an auxiliary storage 70. The computer system may be provided as a dedicated device for designing a layout according to the present disclosure. In addition, the computer system may be configured to drive various programs for design and verification simulation.

The CPU 10 may allow the computer system to execute software (e.g., application programs, operating system, and device drivers). The CPU 10 may process an operating system loaded in the working memory 30. The CPU 10 may execute various application programs driven based on the operating system. For example, the CPU 10 may process one or more of a layout design tool 32, a placement-and-routing tool 34, and an optical proximity correction (OPC) tool 36 that are loaded in the working memory 30.

The operating system or application programs may be loaded in the working memory 30. When the computer system is booted up, based on booting sequence, an operating system image stored in the auxiliary storage 70 may be loaded to the working memory 30. Overall I/O operations of the computer system may be supported by the operating system. Likewise, the working memory 30 may be loaded with the application programs that are selected by a user or provided for a basic service.

The layout design tool 32 for layout design may be loaded from the auxiliary storage 70 to the working memory 30. The working memory 30 may be loaded from the auxiliary storage 70 with the placement-and-routing tool 34 that places designed standard cells and routes the placed standard cells. The working memory 30 may be loaded from the auxiliary storage 70 with the OPC tool 36 that performs an OPC on designed layout data.

The layout design tool 32 may include a bias function by which specific layout patterns are changed in shapes and positions defined by a design rule. In addition, the layout design tool 32 may perform a design rule check (DRC) under the changed bias data condition. The working memory 30 may be either a volatile memory such as static random access memory (SRAM) and dynamic random access memory (DRAM) or a nonvolatile memory such as phase change random access memory (PRAM), magnetic random access memory (MRAM), resistance random access memory (ReRAM), ferroelectric random access memory (FRAM), and NOR Flash memory.

The I/O device 50 may control user input/output operations of user interfaces. For example, the input/output device 50 may include a keyboard or a monitor, allowing a designer to put relevant information. The user may use the I/O device 50 to receive information about semiconductor regions or data paths requiring adjusted operating characteristics. The I/O device 50 may display a progress status or a process result of the OPC tool 36.

The auxiliary storage 70 may serve as a storage medium for the computer system. The auxiliary storage 70 may store the application programs, the operating system image, and various data. The auxiliary storage 70 may be provided in the form of one of memory cards (e.g., MultiMediaCard (MMC), embedded MMC (eMMC), secure digital (SD), and Micro SD) and a hard disk drive (HDD). The auxiliary storage 70 may include a NAND Flash memory having large memory capacity. Additionally, the auxiliary storage 70 may include a NOR Flash memory or a next-generation volatile memory such as PRAM, MRAM, ReRAM, and FRAM.

A system interconnector 90 may be provided to serve as a system bus for providing a network in the computer system. The CPU 10, the working memory 30, the input/output device 50, and the auxiliary storage 70 may be electrically connected through the system interconnector 90 and may exchange data with each other. The system interconnector 90 is not limited to the above description, and may further include intermediary means for efficient management.

Figure 2:
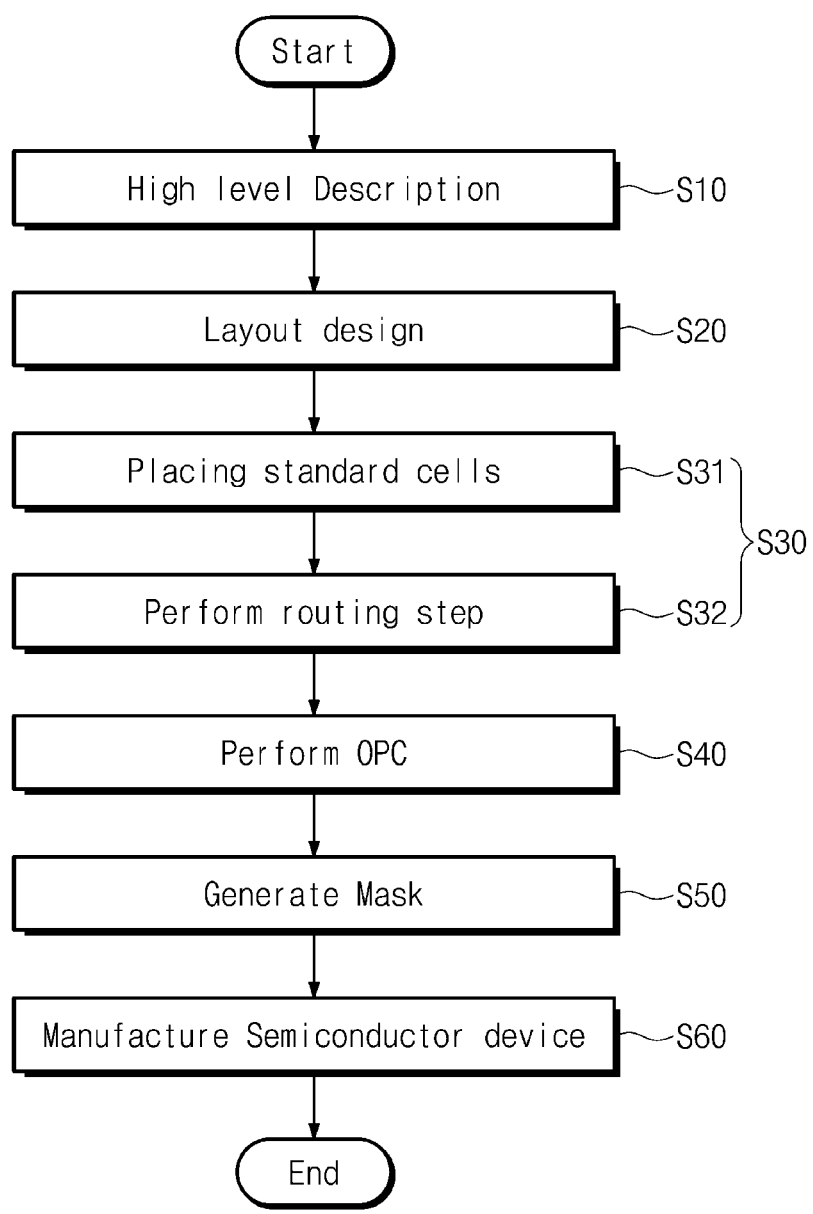
FIG. 2 illustrates a flowchart of a method of designing and fabricating a semiconductor device according to an example embodiment.

FIG. 2 illustrates a flowchart of a method of designing and fabricating a semiconductor device according to an example embodiment.

Referring to FIG. 2, in operation S10, a high-level design of a semiconductor integrated circuit may be performed using the computer system discussed with reference to FIG. 1. The high-level design may refer to an integrated circuit corresponding to a design target being described with a high-level language of a hardware description language. For example, the high-level language, such as C language, may be used in the high-level design step. A register transfer level (RTL) coding or simulation may be used to express in detail circuits designed by the high-level design. In addition, codes created by the resist transfer level coding may be converted into a netlist, which netlist may be synthesized to describe an entire semiconductor device. The synthesized schematic circuit may be verified by a simulation tool, and an adjustment process may be performed based on the verified result.

In operation S20, a layout design may be performed to implement on a silicon substrate a semiconductor integrated circuit that is logically completed. For example, the layout design step may be performed based on the schematic circuit synthesized in the high-level design step or the netlist corresponding to the schematic circuit.

A cell library for the layout design may include information about operation, speed, and power consumption of the standard cell. The cell library for representing a layout of a specific gate-level circuit as a layout may be defined in the layout design tool. The layout may be prepared to define shapes or dimensions of patterns constituting transistors and metal lines that will be practically formed on a silicon substrate. For example, in order to actually form an inverter circuit on a silicon substrate, it may be necessary to appropriately place or describe layout patterns such as p-channel metal-oxide semiconductor (PMOS), n-type MOS (NMOS), N-WELL, gate electrodes, and metal lines thereon. For this, a search may be first performed to select a suitable one of inverters predefined in the cell library.

In operation 530, various standard cells stored in the cell library may be placed and routed. For example, in operation S31, standard cells may be two-dimensionally placed. In operation S32, high-level lines (routing lines) may be provided on the placed standard cells. The standard cells may be well-designedly connected to each other through the routing step. The placement and routing of the standard cells may be automatically performed by the placement-and-routing tool 34.

After the routing step, a verification step may be performed on the layout to check whether any portion of the schematic circuit violates the given design rule. The verification step may include a design rule check (DRC) for verifying whether the layout meets the given design rule, an electrical rule check (ERC) for verifying whether there is an issue of an electrical disconnection in the layout, and a layout versus schematic (LVS) for verifying whether the layout agrees with the gate-level netlist.

In operation 540, an OPC step may be performed. A photolithography process may be employed to achieve on a silicon substrate the layout patterns obtained by the layout design step. The OPC process may be a technique for correcting an unintended optical effect that occurs in the photolithography process. For example, the OPC process may correct an undesirable phenomenon such as refraction or process side effects caused by characteristics of light in an exposure process using the layout patterns. When the OPC step is performed, the designed layout patterns may be slightly changed (or biased) in shapes and positions. After the OPC step, there may be performed a mask rule check (MRC) to determine the presence of part that violates a mask rule.

In operation S50, photomask may be generated based on the layout changed by the OPC. The photomask may generally be manufactured by describing the layout patterns using a chromium layer coated on a glass substrate.

In operation S60, the generated photomask may be used to manufacture a semiconductor device. Various exposure and etching processes may be repeatedly performed in manufacturing the semiconductor device using the photomask. Through these processes discussed above, patterns defined in the layout design may be sequentially formed on a silicon substrate.

Figure 3:
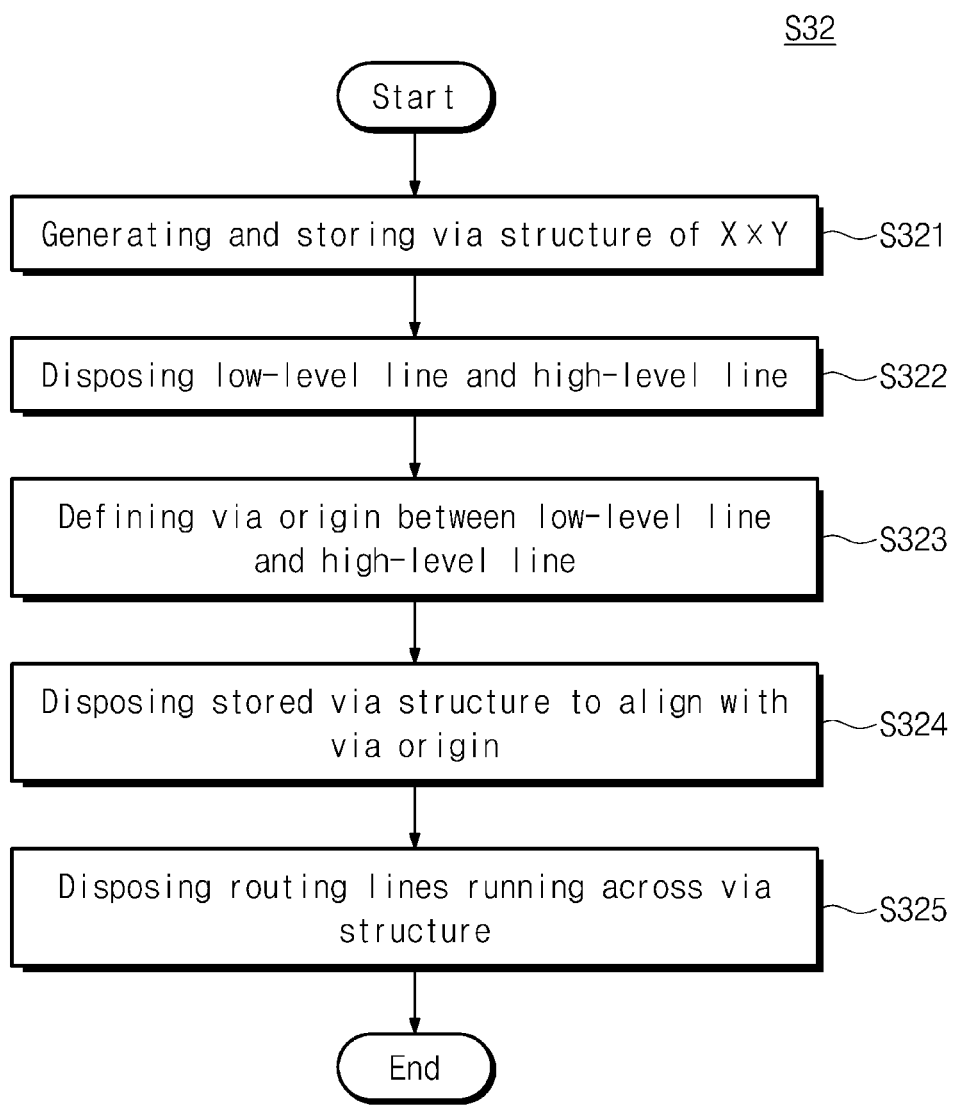
FIG. 3 illustrates a flowchart of an operation of FIG. 2 according to an example embodiment.

FIG. 3 illustrates a flowchart of operation S32 (i.e., the routing step) of FIG. 2 according to an example embodiment.

Referring to FIG. 3, operation S32 (i.e., the routing step) according to the present disclosure may include generating and placing via structures. The via structure according to the present disclosure may be disposed on a back-end-of-line (BEOL) layer, or a wiring layer. The via structure may be a structure that vertically connects a first line positioned at a low-level layer to a second layer positioned at a high-level layer. In an embodiment, the via structure may vertically transfer a power (e.g., VDD and/or VSS) between the first line and the second line. In another embodiment, the via structure may vertically transfer a signal between the first line and the second line.

The routing step according to the present disclosure may include an operation S321 of generating a via structure of X×Y and storing the via structure of X×Y in the placement-and-routing tool 34 (referred to herein as a routing tool). For example, the routing tool 34 according to the present disclosure may include IC Compiler II commercially available from Synopsys, Inc. The following will sequentially describe a via structure according to a comparative example of the present disclosure and a via structure according to some embodiments of the present disclosure.

Figure 5:
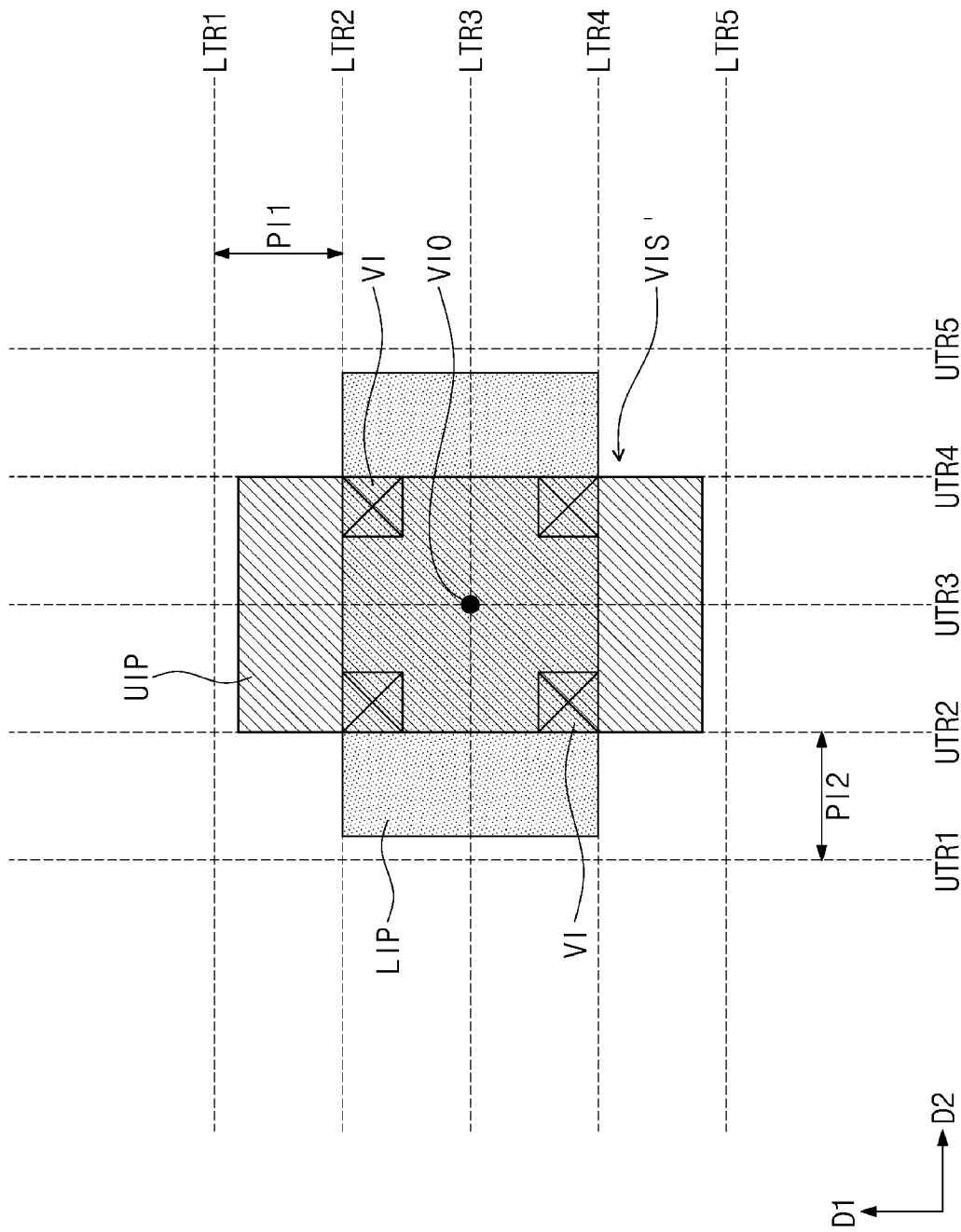
FIGS. 5 and 6 are plan views of a layout of a via structure according to an example embodiment.
Figure 6:
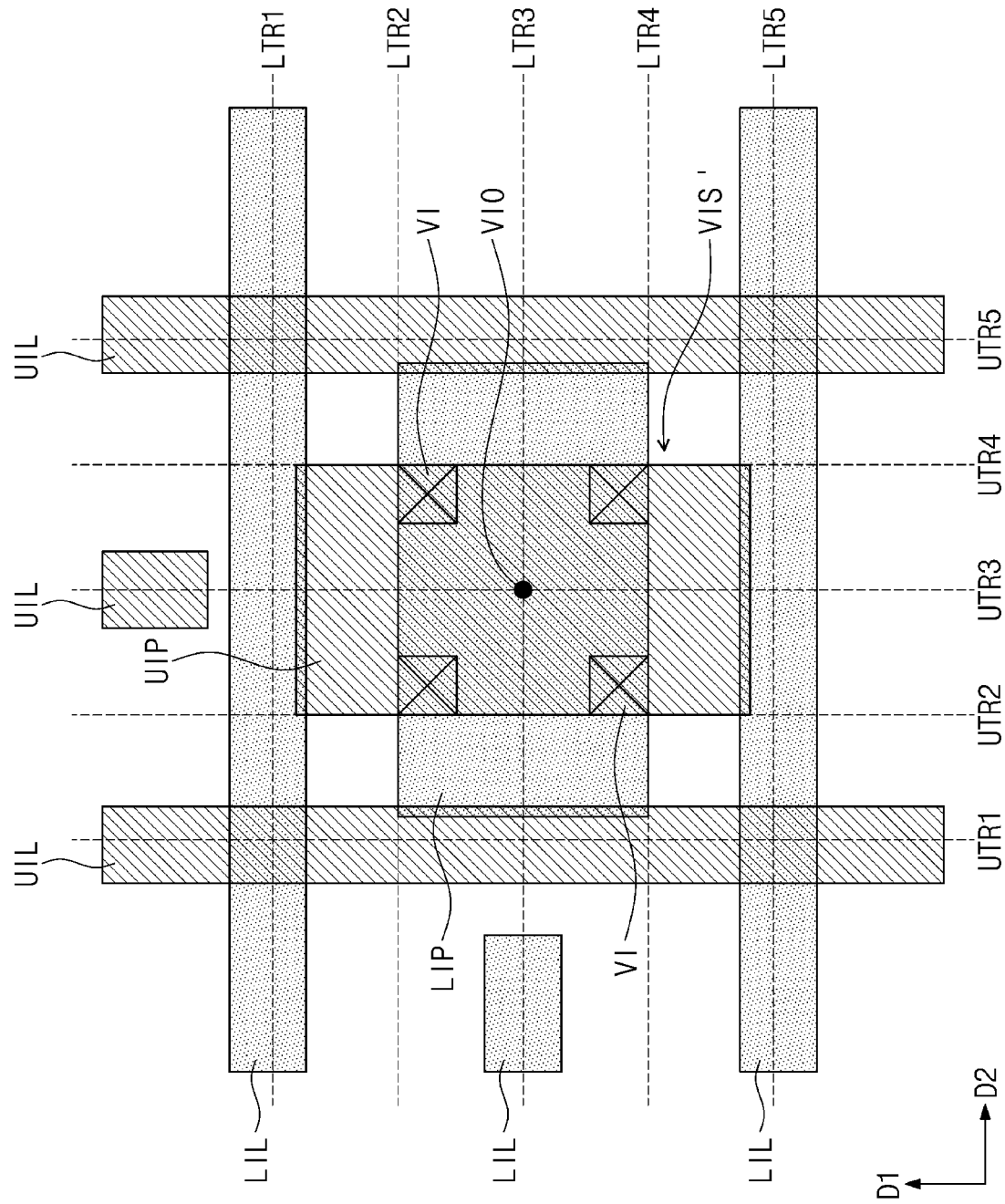

FIGS. 5 and 6 are plan views of a layout of a via structure according to an example embodiment.

Referring to FIG. 5, the via structure VIS' may include a lower line pattern LIP, an upper line pattern UIP, and a plurality of vias VI. The plurality of vias VI may be disposed on a region where the lower line pattern LIP overlaps the upper line pattern UIP. The plurality of vias VI may each define a conductor for vertical connection between the lower line pattern LIP and the upper line pattern UIP.

The lower line pattern LIP may be one of lines at an Mn layer, and the upper line pattern UIP may be one of lines at an Mn+1 layer. The plurality of vias VI may be Vn+1 vias between the Mn layer and the Mn+1 layer. The subscript n may be an integer between 1 and 20. For example, the lower line pattern LIP may correspond to an M4 layer, the upper line pattern UIP may correspond to an M5 layer, and the vias VI may correspond to V5 vias.

The number of the plurality of vias VI may be X×Y. Each of X and Y may be an integer between 1 and 20. The via structure VIS' may be a vias structure of 2×2. Therefore, four vias VI may be arranged in 2×2. The expression X×Y may refer to a via size.

The via structure VIS'le may be automatically generated by the routing tool 34. A vertical connection for power or signal between the Mn layer and the Mn+1 layer may be required at a specific point (referred to hereinafter as a via origin VIO). When the routing tool 34 receives a via size (e.g., X×Y) required for the vertical connection, there may be generated the via structure VIS' shaped like that in FIG. 5. The via structure VIS' may be generated and disposed to allow it center to align with a center of the via origin VIO. The vias VI of the via structure VIS' may be arranged in an X×Y matrix around the via origin VIO that serves as a center of the X×Y matrix.

The routing tool 34 may generate the lower line pattern LIP and the upper line pattern UIP that are allowed to overlap the vias VI arranged in X×Y. Each of the lower and upper line patterns LIP and UIP may be generated to have a plate or bar shape that covers a via size of X×Y. For example, each of the lower and upper line patterns LIP and UIP may have a relatively large line-width.

The Mn layer may include first to fifth lower line tracks LTR1 to LTR5 that are arranged along a first direction D1 at a first pitch PI1. The first to fifth lower line tracks LTR1 to LTR5 may define a track (or region) where wiring lines of the Mn layer can be disposed. The Mn+1 layer may include first to fifth upper line tracks UTR1 to UTR5 that are arranged along a second direction D2 at a second pitch PI2. The first to fifth upper line tracks UTR1 to UTR5 may define a track (or region) where wiring lines of the Mn+1 layer can be disposed.

As discussed above, the routing tool 34 may generate one lower line pattern LIP and one upper line pattern UIP that can cover a via size of X×Y. Therefore, the lower line pattern LIP may occupy the second, third, and fourth lower line tracks LTR2, LTR3, and LTR4. The upper line pattern UIP may occupy the second, third, and fourth line tracks UTR2, UTR3, and UTR4.

Referring to FIG. 6, after the placement of the via structure VIS', the routing step S32 may be continuously performed to place routing lines. For example, lower lines LIL may be disposed on the Mn layer, and upper lines UIL may be disposed on the Mn+1 layer. Each of the lower lines LIL may be disposed on one of the first to fifth lower line tracks LTR1 to LTR5, and each of the upper lines UIL may be disposed on one of the first to fifth upper line tracks UTR1 to UTR5. The lower lines LIL and the upper lines UIL may be routing lines for connecting stand cells to each other.

As discussed above, as the lower line pattern LIP of the via structure VIS' occupies the second, third, and fourth lower line tracks LTR2, LTR3, and LTR4, the lower line LIL may be difficult to rest on the second, third, and fourth lower line tracks LTR2, LTR3, and LTR4. For example, the lower line LIL on the first lower line track LTR1 and the lower line LIL on the fifth lower line track LTR5 may extend in the second direction D2 without interruption across the via structure VIS'. For example, each of the lower lines LIL on the first and fifth lower line tracks LTR1 and LTR5 may sufficiently serve as a routing line.

However, the lower line pattern LIP may not allow the lower line LIL on the third lower line track LTR3 to extend in the second direction across the via structure VIS'. For example, the lower line LIL on the third lower line track LTR3 may not serve as a routing line.

As discussed above, as the upper line pattern UIP of the via structure VIS' occupies the second, third, and fourth upper line tracks UTR2, UTR3, and UTR4, the upper line UIL may be difficult to rest on the second, third, and fourth upper line tracks UTR2, UTR3, and UTR4. For example, the upper line UIL on the first upper line track UTR1 and the upper line UIL on the fifth upper line track UTR5 may extend in the first direction D1 without interruption across the via structure VIS'. For example, each of the upper lines UIL on the first and fifth upper line tracks UTR1 and UTR5 may sufficiently serve as a routing line.

However, the upper line pattern UIP may not allow the upper line UIL on the third upper line track UTR3 to extend in the first direction D1 across the via structure VIS'. For example, the upper line UIL on the third upper line track UTR3 may not serve as a routing line.

When a user only defines a via size of X×Y, the routing tool 34 may automatically generate the via structure VIS' according to a comparative example. However, the via structure VIS' may occupy relatively large areas of lower line tracks on the Mn layer and of upper line tracks on the Mn+1 layer. Thus, there may be problems such as the insufficient number of routing tracks and an adverse effect on high integration of a semiconductor device.

Figure 7:
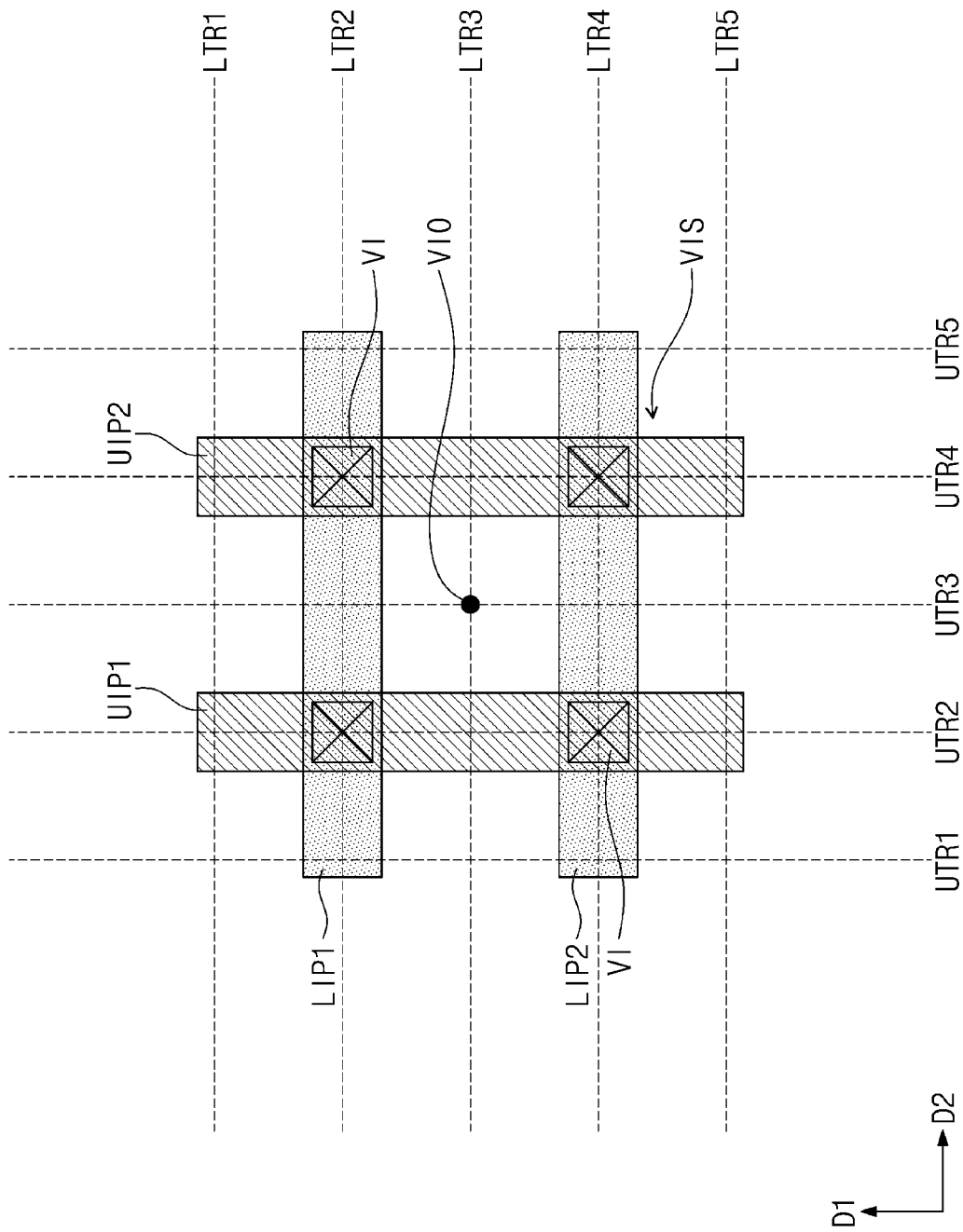
FIGS. 7 and 8 are plan views of a layout of a via structure according to an example embodiment.
Figure 8:
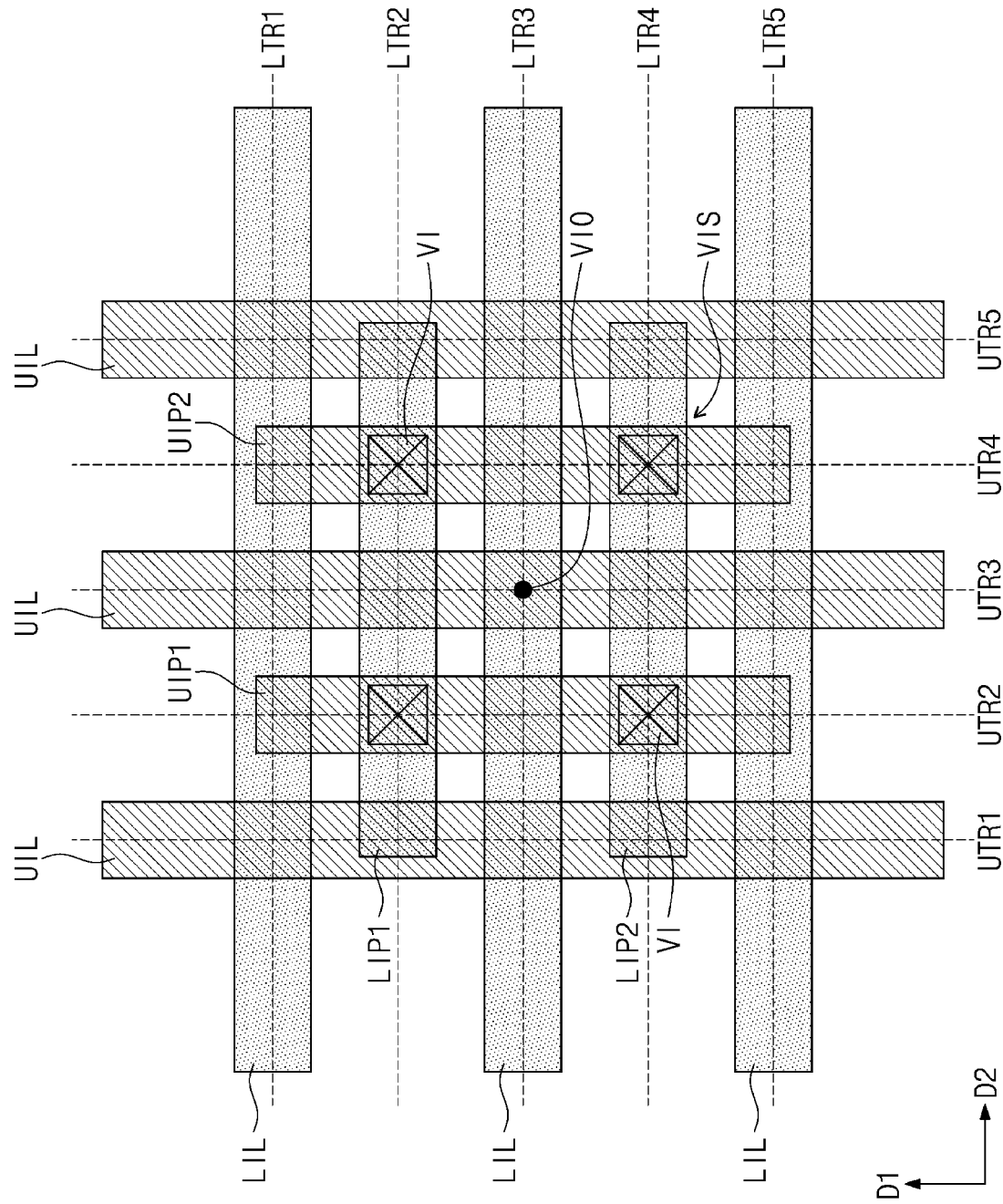

FIGS. 7 and 8 are plan views of a layout of a via structure according to an example embodiment.

Referring to FIG. 7, the via structure VIS according to the present disclosure may include first and second lower line patterns LIP1 and LIP2, first and second upper line patterns UIP1 and UIP2, and a plurality of vias VI. The plurality of vias VI may be correspondingly disposed on regions where the first and second lower line patterns LIP1 and LIP2 overlap the first and second upper line patterns UIP1 and UIP2.

The first and second lower line patterns LIP1 and LIP2 may be wiring lines at an Mn layer, and the first and second upper line patterns UIP1 and UIP2 may be wiring lines at an Mn+1 layer. The plurality of vias VI may be Vn+1 vias between the Mn layer and the Mn+1 layer. For example, the first and second lower line patterns LIP1 and LIP2 may correspond to wiring lines at an M4 layer, the first and second upper line patterns UIP1 and UIP2 may correspond to wiring lines at an M5 layer, and the vias VI may correspond to V5 vias.

The number of the plurality of vias VI may be X×Y. The via structure VIS according to the present disclosure may be a via structure of 2×2. The via structure VIS according to the present disclosure may be disposed to allow its center to align with a via origin VIO. The vias VI of the via structure VIS may be arranged in an X×Y matrix around the via origin VIO that serves as a center of the X×Y matrix.

The via structure VIS according to the example embodiment may include lower line patterns LIP whose number is X and upper line patterns UIP whose number is Y. The X numbers of the lower line patterns LIP extending in the second direction D2 and the Y numbers of the upper line patterns UIP extending in the first direction D1 may intersect each other to allow the via structure VIS to have a mesh shape.

Each of the lower line patterns LIP of the via structure VI may have a line-width substantially the same as that of each of lower lines LIL which will be discussed below. Each of the upper line patterns UIP of the via structure VI may have a line-width substantially the same as that of each of upper lines UIL which will be discussed below.

For example, the first lower line pattern LIP1 and the second lower line pattern LIP2 may be respectively disposed on a second lower line track LTR2 and a fourth lower line track LTR4. The first and second lower line patterns LIP1 and LIP2 may be spaced apart from each other. Therefore, a third lower line track LTR3 between the first and second lower line patterns LIP1 and LIP2 may remain as an empty region that is not occupied by the via structure VIS.

For example, the first upper line pattern UIP1 and the second upper line pattern UIP2 may be respectively disposed on a second upper line track UTR2 and a fourth upper line track UTR4. The first and second upper line patterns UIP1 and UIP2 may be spaced apart from each other. Therefore, a third upper line track UTR3 between the first and second upper line patterns UIP1 and UIP2 may remain as an empty region that is not occupied by the via structure VIS.

Referring to FIG. 8, after the placement of the via structure VIS, the routing step may be continuously performed to place routing lines. For example, lower lines LIL may be disposed on the Mn layer, and upper lines UIL may be disposed on the Mn+1 layer.

As discussed above, as the first and second lower line patterns LIP1 and LIP2 of the via structure VIS respectively occupy the second and fourth lower line tracks LTR2 and LTR4, the lower lines LIL may be positioned on remaining first, third, and fifth lower line tracks LTR1, LTR3, and LTR5. For example, the lower line LIL on the first lower line track LTR1, the lower line LIL on the third lower line track LTR3, and the lower line LIL on the fifth lower line track LTR5 may extend in the second direction D2 without interruption across the via structure VIS. For example, three lower lines LIL may each serve as a routing line.

As discussed above, as the first and second upper line patterns UIP1 and UIP2 of the via structure VIS respectively occupy the second and fourth upper line tracks UTR2 and UTR4, the upper lines UIL may be positioned on remaining first, third, and fifth upper line tracks UTR1, UTR3, and UTR5. For example, the upper line UIL on the first upper line track UTR1, the upper line UIL on the third upper line track UTR3, and the upper line UIL on the fifth upper line track UTR5 may extend in the first direction D1 without interruption across the via structure VIS. For example, three upper lines UIL may each serve as a routing line.

As illustrated in FIG. 6, the via structure VIS' may be configured such that neither the third lower line track LTR3 nor the third upper line track UTR3 may serve as a routing track. In contrast, even though the via structure VIS of FIG. 8 according to the present disclosure is a 2×2 via structure the same as the via structure VIS', the third lower line track LTR3 and the third upper line track UTR3 may each be additionally used as a routing track.

The via structure VIS according to the present disclosure may occupy relatively small areas of lower line tracks on the Mn layer and of upper line tracks on the Mn+1 layer. According the present disclosure, there may be an increase in the number of routing tracks capable of being used around the via structure VIS, an increase in the degree of routing freedom, and an achievement in high integration of a semiconductor device.

The via structure VIS according to the present disclosure may not be automatically generated by the routing tool 34 such as IC Compiler II. When a user manually generates the via structure VIS every time, a routing step may problematically become complicated and slow. According to the present disclosure, in order to solve the problems mentioned above, various via structures VIS of X×Y may be first generated (or defined) and stored in the routing tool 34, and then may be promptly and easily used in a routing step.

Figure 4:
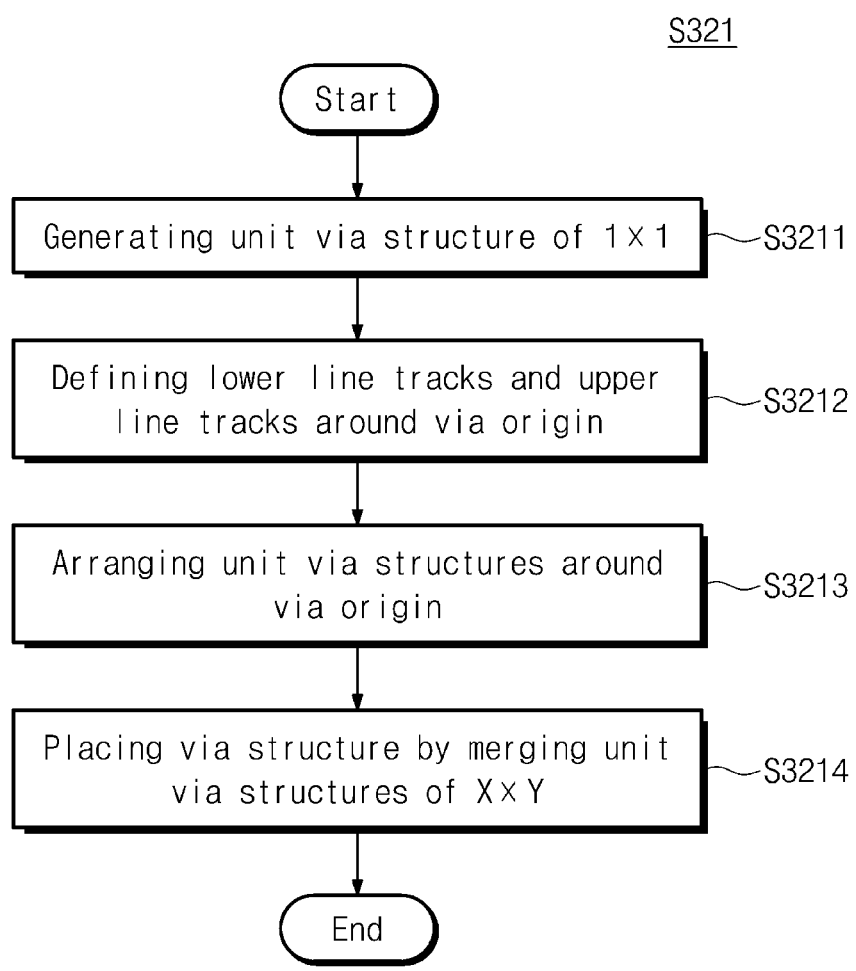
FIG. 4 illustrates a flowchart of an operation in FIG. 3 according to an example embodiment.
Figure 9:
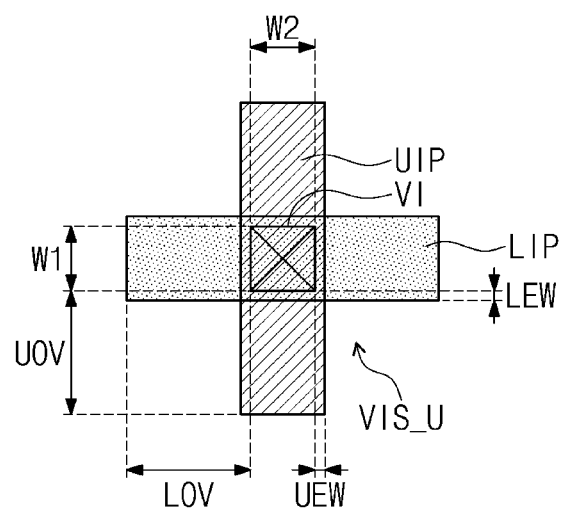
FIGS. 9, 10 and 11 are plan views of a layout for explaining the flowchart of FIG. 4, according to an example embodiment.
Figure 10:
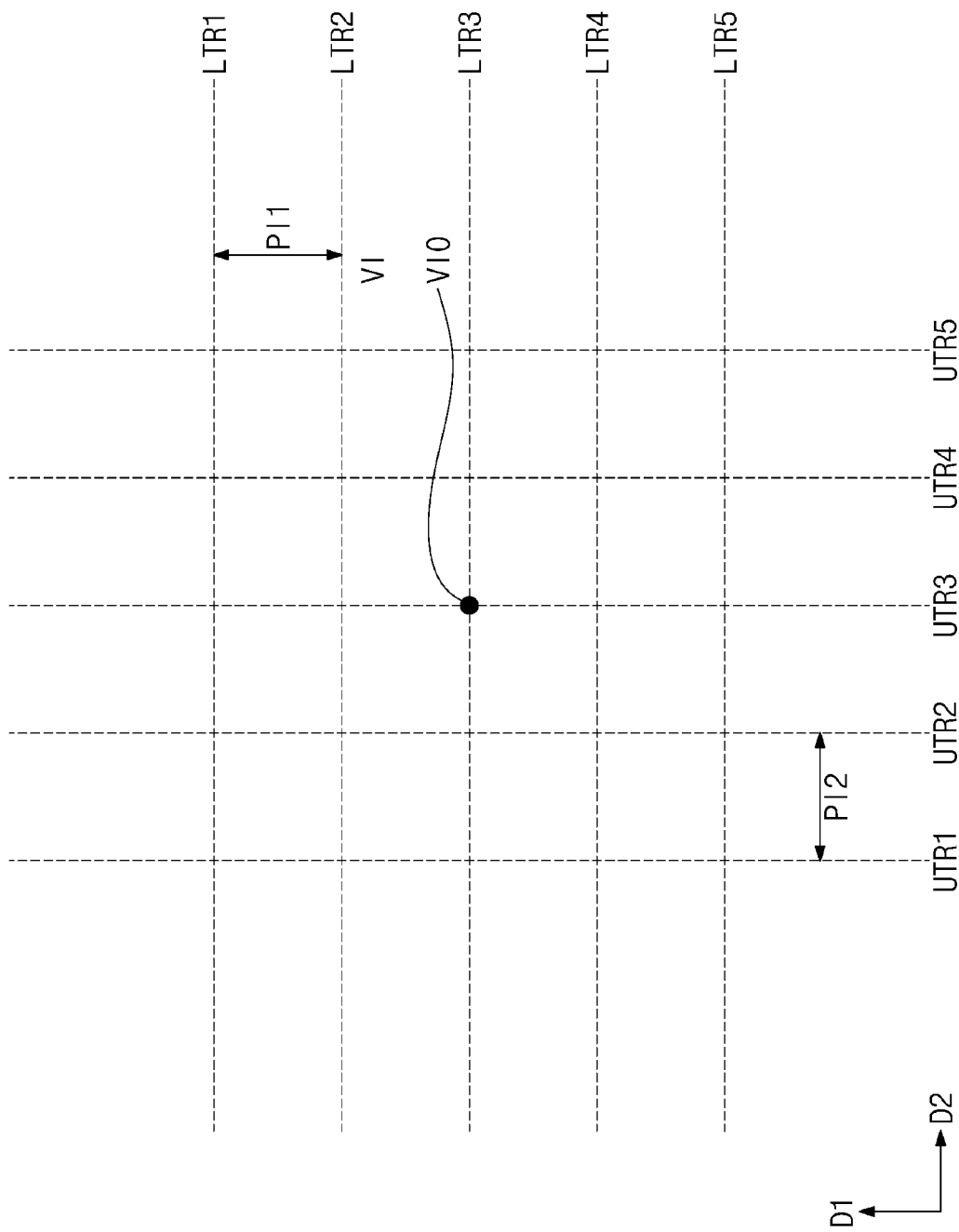
Figure 11:
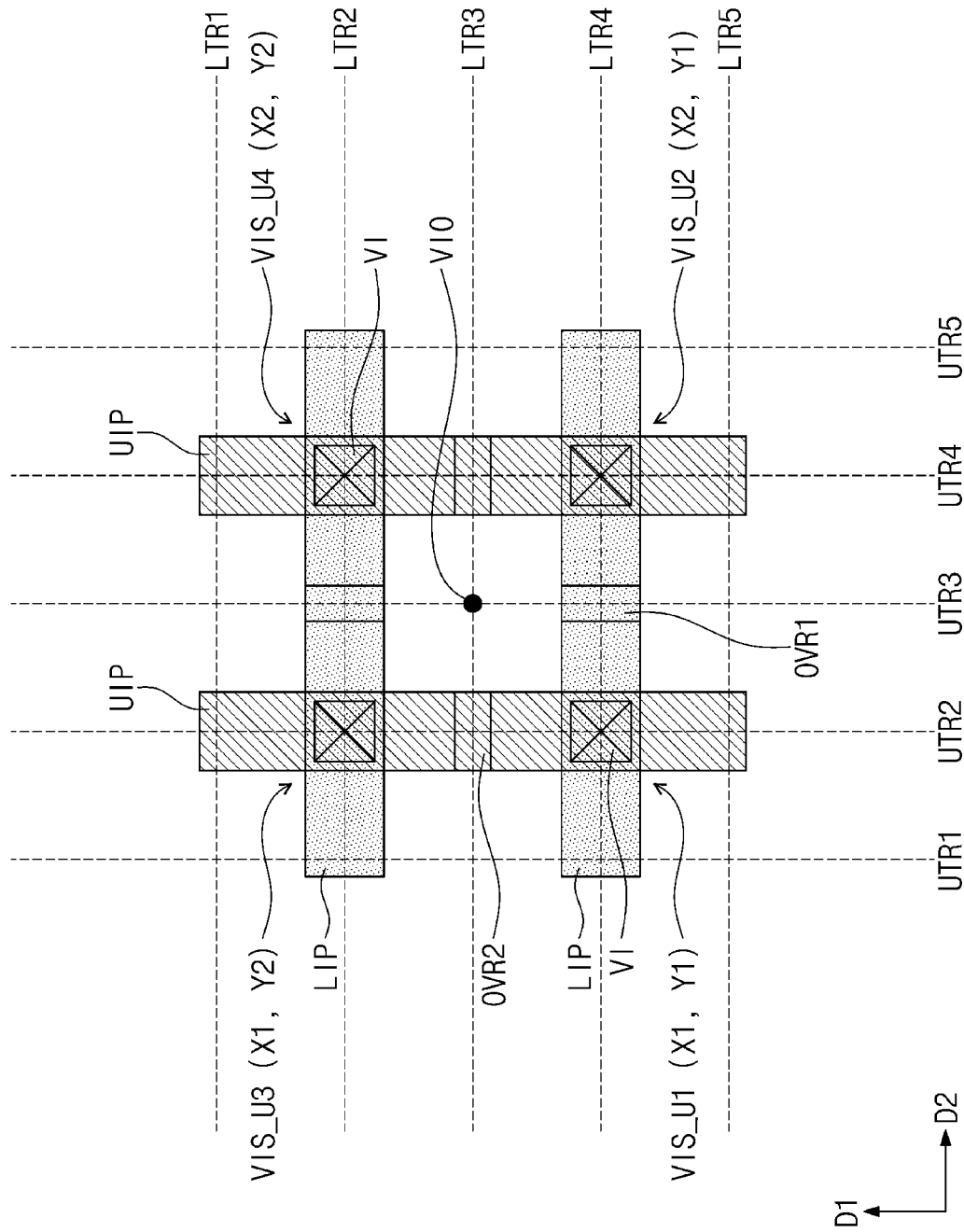

FIG. 4 illustrates a flowchart of operation S321 of FIG. 3 according to an example embodiment. FIGS. 9, 10 and 11 are plan views of a layout for explaining the flowchart of FIG. 4, according to an example embodiment.

Referring to FIGS. 4 and 9, in operation S3211, a unit via structure VIS_U of 1×1 may be generated. The unit via structure VIS_U may be a unit made of one via VI that constitutes the via structure VIS discussed in FIG. 7. For example, the via structure VIS of FIG. 7 may be made of unit via structures VIS_U arranged in 2×2.

In an embodiment, information about the Mn layer, Mn+1 layer, and the Vn+1 via may be extracted from a technology file of the routing tool 34. The via VI may be disposed by using the information about Vn+1 via of the technology file. The information about Vn+1 via of the technology file may include a first width W1 in the first direction D1 of the via VI and a second width W2 in the second direction D2 of the via VI.

The lower line pattern LIP on the Mn layer may be disposed to overlap the via VI. The information about the Mn layer of the technology file may be used to determine an extending direction, an enclosure width LEW, and an overhang length LOV of the lower line pattern LIP. The enclosure width LEW may be a required minimum length to the via VI from one lateral surface of the lower line pattern LIP. A line-width of the lower line pattern LIP may be defined as 2×LEW+W1. The overhang length LOV may be a required minimum length to the via VI from one end of the lower line pattern LIP. A length of the lower line pattern LIP may be defined as 2×LOV+W2.

The upper line pattern UIP on the Mn layer may be disposed to overlap the via VI. The information about the Mn+1 layer of the technology file may be used to determine an extending direction, an enclosure width UEW, and an overhang length UOV of the upper line pattern UIP. The enclosure width UEW may be a required minimum length to the via VI from one lateral surface of the upper line pattern UIP. A line-width of the upper line pattern UIP may be defined as 2×UEW+W2. The overhang length UOV may be a required minimum length to the via VI from one end of the upper line pattern UIP. A line-width of the upper line pattern UIP may be defined as 2×UOV+W1.

The upper line pattern UIP and the lower line pattern LIP may intersect each other around the via VI that serves as an intersection center. Therefore, the unit via structure VIS_U may have a cross shape.

Referring to FIGS. 4 and 10, in operation S3212, lower line tracks LTR and upper line tracks UTR may be defined around a via origin VIO. The lower line tracks LTR may be defined based on the information about the Mn layer of the technology file, and the upper line tracks UTR may be defined based on the information about the Mn+1 layer of the technology file.

For example, the lower line tracks LTR may include first to fifth lower line tracks LTR1 to LTR5. The first to fifth lower line tracks LTR1 to LTR5 may be arranged along a first direction D1 at a first pitch PI1. The upper line tracks UTR may include first to fifth upper line tracks UTR1 to UTR5. The first to fifth upper line tracks UTR1 to UTR5 may be arranged along a second direction D2 at a second pitch PI2. The via origin VIO may be defined at a point where the third lower line track LTR3 intersects the third upper line track UTR3.

Referring to FIGS. 4 and 11, in operation S3213, unit via structures VIS_U may be arranged in an X×Y matrix around the via origin VIO that serves as a center of the X×Y matrix. The unit via structure VIS_U may be disposed to allow the lower line pattern LIP to align with the lower line track LTR and also to allow the upper line pattern UIP to align with the upper line track UTR.

For example, a first unit via structure VIS_U1 may be disposed on a coordinate of (X1, Y1). A second unit via structure VIS_U2 may be disposed on a coordinate of (X2, Y1). The second unit via structure VIS_U2 may be placed in the second direction D2 from the first unit via structure VIS_U1 across one upper line track (e.g., the third upper line track UTR3). A first overlap region OVR1 may be generated where the lower line pattern LIP of the first unit via structure VIS_U1 intersects the lower line pattern LIP of the second unit via structure VIS_U2.

A third unit via structure VIS_U3 may be disposed on a coordinate of (X1, Y2). The third unit via structure VIS_U3 may be placed in the first direction D1 from the first unit via structure VIS_U1 across one lower line track (e.g., the third lower line track LTR3). A second overlap region OVR2 may be generated where the upper line pattern UIP of the first unit via structure VIS_U1 intersects the upper line pattern UIP of the third unit via structure VIS_U3.

A fourth unit via structure VIS_U4 may be disposed on a coordinate of (X2, Y2). The fourth unit via structure VIS_U3 may be placed in the first direction D1 from the second unit via structure VIS_U2 across one lower line track (e.g., the third lower line track LTR3). The fourth unit via structure VIS_U4 may be placed in the second direction D2 from the third unit via structure VIS_U3 across one upper line track (e.g., the third upper line track UTR3).

The lower line patterns LIP of the first to fourth unit via structures VIS_U1 to VIS_U4 may be disposed on even-numbered lower line tracks (e.g., the second and fourth lower line tracks LTR2 and LTR4). Odd-numbered lower line tracks (e.g., the first, third, and fifth lower line tracks LTR1, LTR3, and LTR5) may be used as lower routing tracks. The upper line patterns UIP of the first to fourth unit via structures VIS_U1 to VIS_U4 may be disposed on even-numbered upper line tracks (e.g., the second and fourth upper line tracks UTR2 and UTR4). Odd-numbered upper line tracks (e.g., the first, third, and fifth upper line tracks UTR1, UTR3, and UTR5) may be used as upper routing tracks.

In operation S3214, the unit via structures VIS_U arranged in the X×Y matrix may be placed into a single via structure VIS. For example, the unit via structures VIS_U of FIG. 11 may be merged through the first and second overlap regions OVR1 and OVR2 into a single connected piece. Therefore, a 2×2 via structure VIS may be generated illustrated in FIG. 7.

The merged (or generated) X×Y via structure VIS may be stored in the routing tool 34 of FIG. 1. For example, information about coordinates of the unit via structures VIS_U arranged in X×Y may be extracted and stored in the routing tool 34. The stored coordinate information may be used such that, as illustrated in FIG. 7, the X×Y via structure VIS may be immediately generated and used in a routing step. For example, the present disclosure may generate and store in advance the X×Y via structure VIS in the routing tool 34 through the steps of FIGS. 9 to 11. Afterwards, it may be possible to promptly and easily use the X×Y via structure VIS stored in a routing step in which the routing tool 34 is used.

Figure 12B:
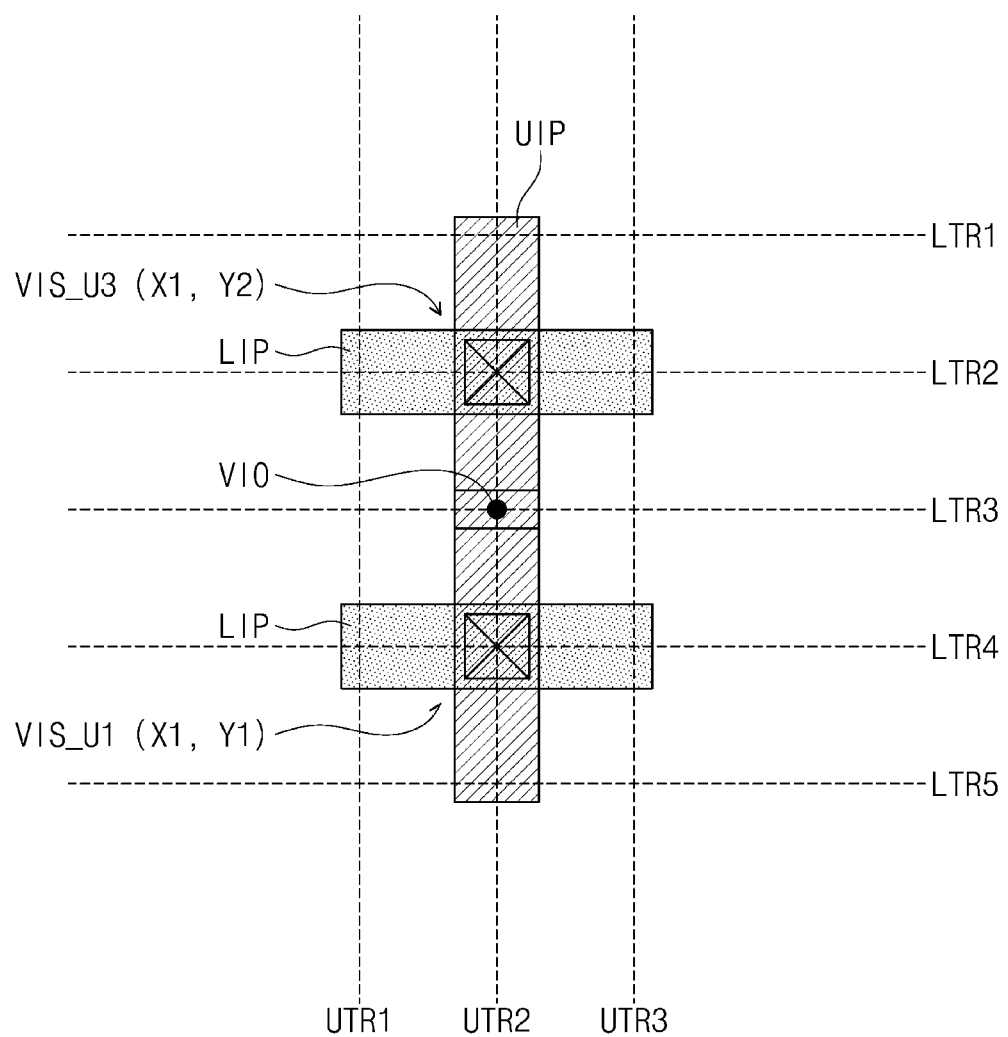
Figure 12C:
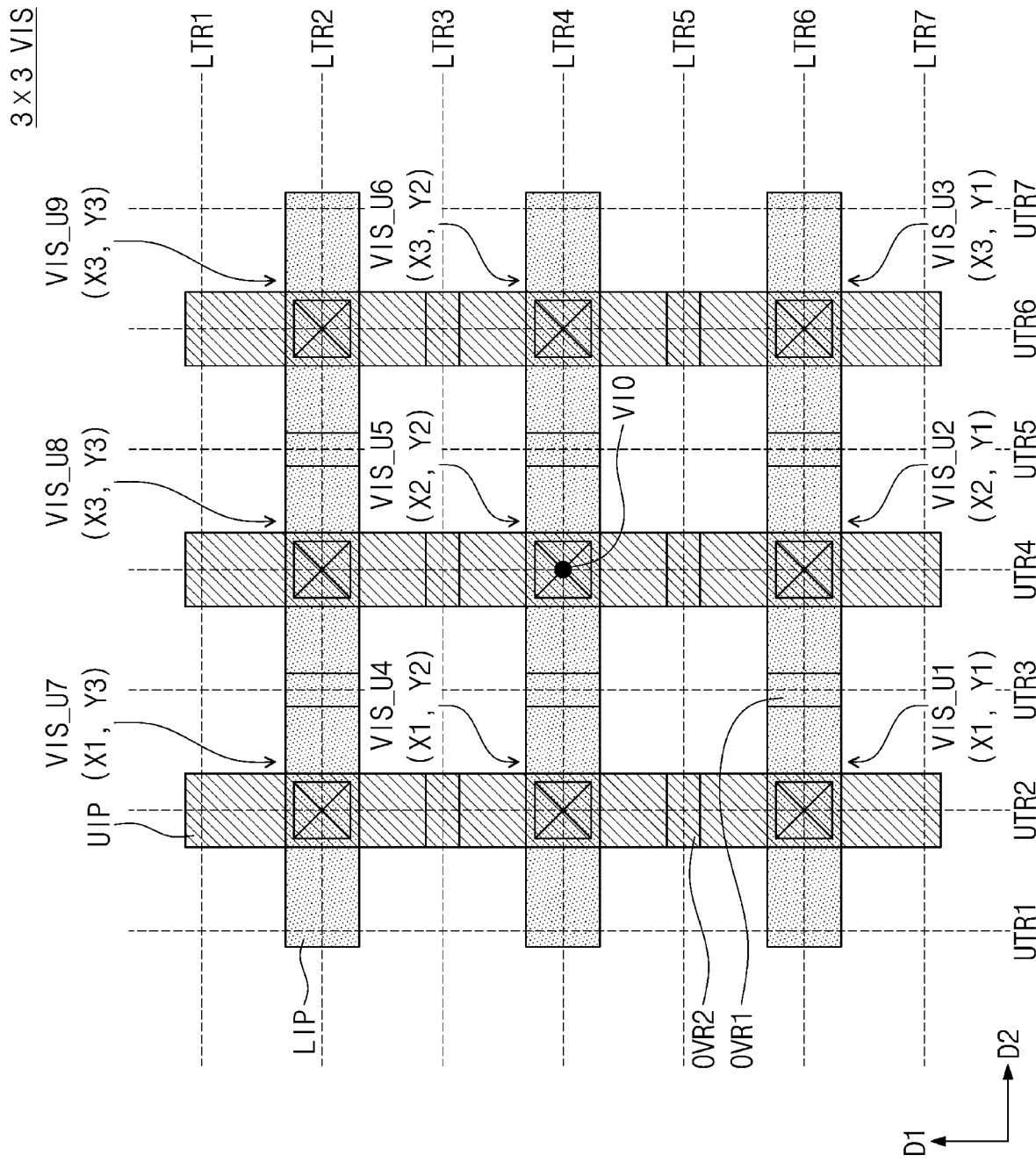

FIGS. 12A, 12B, and 12C are plan views of a layout for various via structures formed using unit via structures according to an example embodiment.

According to the present disclosure, the unit via structure VIS_U may be used to generate and store in advance various via structures VIS while changing each value of X and Y. For example, as illustrated in FIG. 12A, two unit via structures VIS_U may be arranged to generate and store a via structure VIS of 2×1. As illustrated in FIG. 12B, two unit via structures VIS_U may be arranged to generate and store a via structure VIS of 1×2. As illustrated in FIG. 12C, nine unit via structures VIS_U may be arranged to generate and store a via structure VIS of 3×3. The unit via structure VIS_U that is defined in advance may be arranged in the X×Y matrix to easily generate and store variously-sized via structures VIS in advance.

For the X×Y via structure VIS according to the present disclosure, (X−1)+(Y−1) numbers of routing tracks may additionally be securely obtained. For example, the 3×3 via structure VIS shown in FIG. 12 may occupy neither the third lower line track LTR3 nor the fifth lower line track LTR5, and thus two lower line tracks may be securely obtained. The 3×3 via structure VIS shown in FIG. 12 may occupy neither the third upper line track UTR3 nor the fifth upper line track UTR5, and thus two upper line tracks may be securely obtained. Therefore, the 3×3 via structure VIS may additionally secure a total of four routing tracks.

Figure 14:
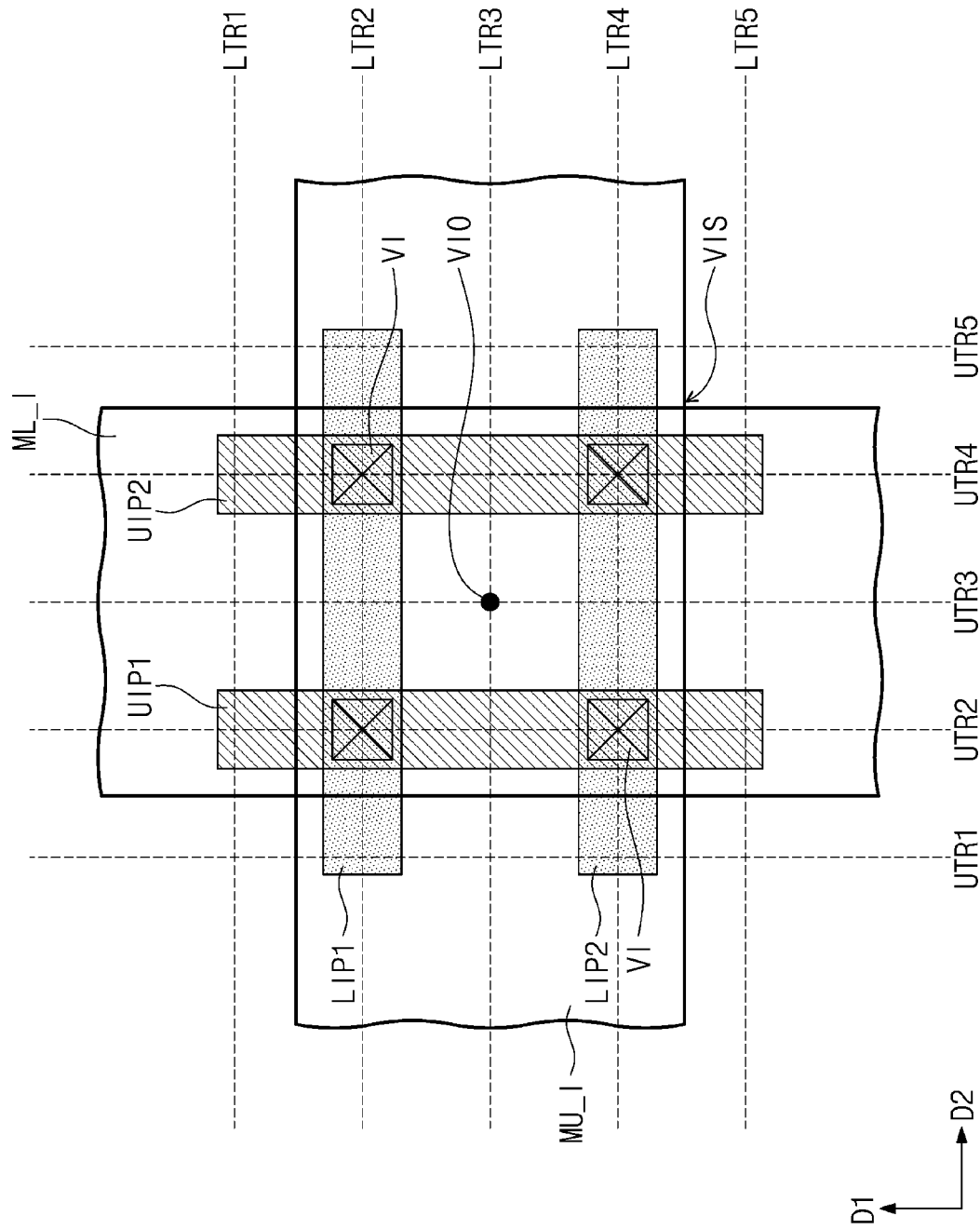
Figure 15:
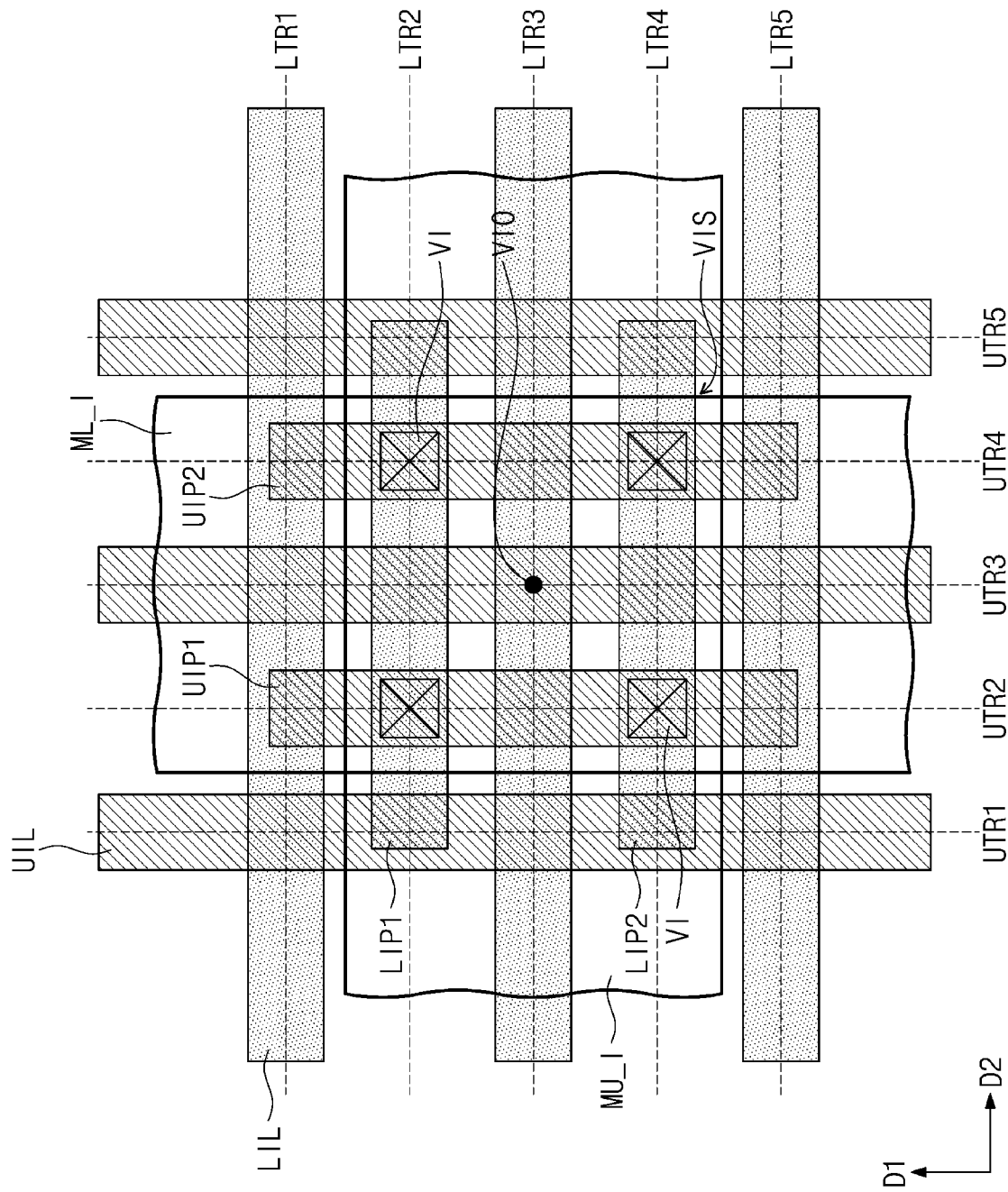

With reference back to FIG. 3, the following will describe in detail the routing step according to the present disclosure. FIGS. 13, 14 and 15 are plan views of a layout for explaining the routing step of FIG. 3 according to an example embodiment.

Referring to FIGS. 3 and 13, in operation S322, a low-level line ML_I and a high-level line MU_I may be disposed. The low-level line ML_I may have a linear shape that extends in the first direction D1, and the high-level line MU_I may have a linear shape that extends in the second direction D2. In an embodiment, the low-level line ML_I may be a wiring line at an Mn−1 layer, and the high-level line MU_I may be a wiring line at an Mn+2 layer.

In operation S323, a via origin VIO may be defined to vertically connect the low-level line ML_I to the high-level line MU_I. The via origin VIO may be provided in a region where the low-level line ML_I overlaps the high-level line MU_I. The via origin VIO may define a position where is disposed the X×Y via structure VIS prepared as shown in FIG. 4.

Referring to FIGS. 3 and 14, according to the present disclosure, in operation S324, the X×Y via structure VIS stored in the routing tool 34 may be disposed to align with the via origin VIO. For example, the 2×2 via structure VIS may be disposed which is discussed in FIG. 11. The via structure VIS may be disposed to allow the first and second lower line patterns LIP1 and LIP2 to respectively align with the second and fourth lower line tracks LTR2 and LTR4 of the Mn layer. The via structure VIS may be disposed to allow the first and second upper line patterns UIP1 and UIP2 to respectively align with the second and fourth upper line tracks UTR2 and UTR4 of the Mn+1 layer.

The low-level line ML_I and the high-level line MU_I may penetrate the Mn layer and the Mn+1 layer and may vertically connect to each other through the via structure VIS. The via structure VIS may serve to vertically transfer a power (e.g., VDD or VSS) or a signal between the low-level line ML_I and the high-level line MU_I.

The 2×2 via structure VIS according to the example embodiment may be one of the X×Y via structures VIS stored in the routing tool 34 as discussed above with reference to FIG. 4. According to the present disclosure, among the previously prepared X×Y via structures VIS, the 2×2 via structure VIS which will be disposed between the low-level and high-level lines ML_I and MU_I may be directly retrieved from the routing tool 34 and then arranged. In this case, it may not be required to manually dispose each of the lower and upper line patterns LIP and UIP of the 2×2 via structure VIS, and accordingly it may be possible to promptly perform the routing step.

Referring to FIGS. 3 and 15, in operation S325, routing lines may be disposed on each of the Mn layer and the Mn+1 layer. As discussed above with reference to FIG. 8, the lower lines LIL may be disposed on the Mn layer, and the upper lines UIL may be disposed on the Mn+1 layer. The lower lines LIL may be placed on the first, third, and fifth lower line tracks LTR1, LTR3, and LTR5. The upper line UIL may be placed on the first, third, and fifth upper line tracks UTR1, UTR3, and UTR5.

At least one lower line LIL, such as the lower line LIL on the third lower line track LTR3, may extend in the second direction D2 while running across the via structure VIS. At least one upper line UIL, such as the upper line UIL on the third upper line track UTR3, may extend in the first direction D1 while running across the via structure VIS. The lower line LIL on the third lower line track LTR3 and the upper line UIL on the third upper line track UTR3 may each serve as a routing line.

The routing tool 34 of FIG. 1 may be used to execute a method (e.g., a routing step) of designing a semiconductor device discussed with reference to FIGS. 3 and 4 according to the present disclosure. The routing tool 34 may be a computer program product either including a computer-readable program code or a non-transitory computer-usable medium in which a computer-readable program code is included. Additionally or alternatively, the routing tool 34 of the present disclosure may be a product that can be downloaded from internet. For example, the routing tool 34 may include IC Compiler II commercially available from Synopsys, Inc.

Figure 16:
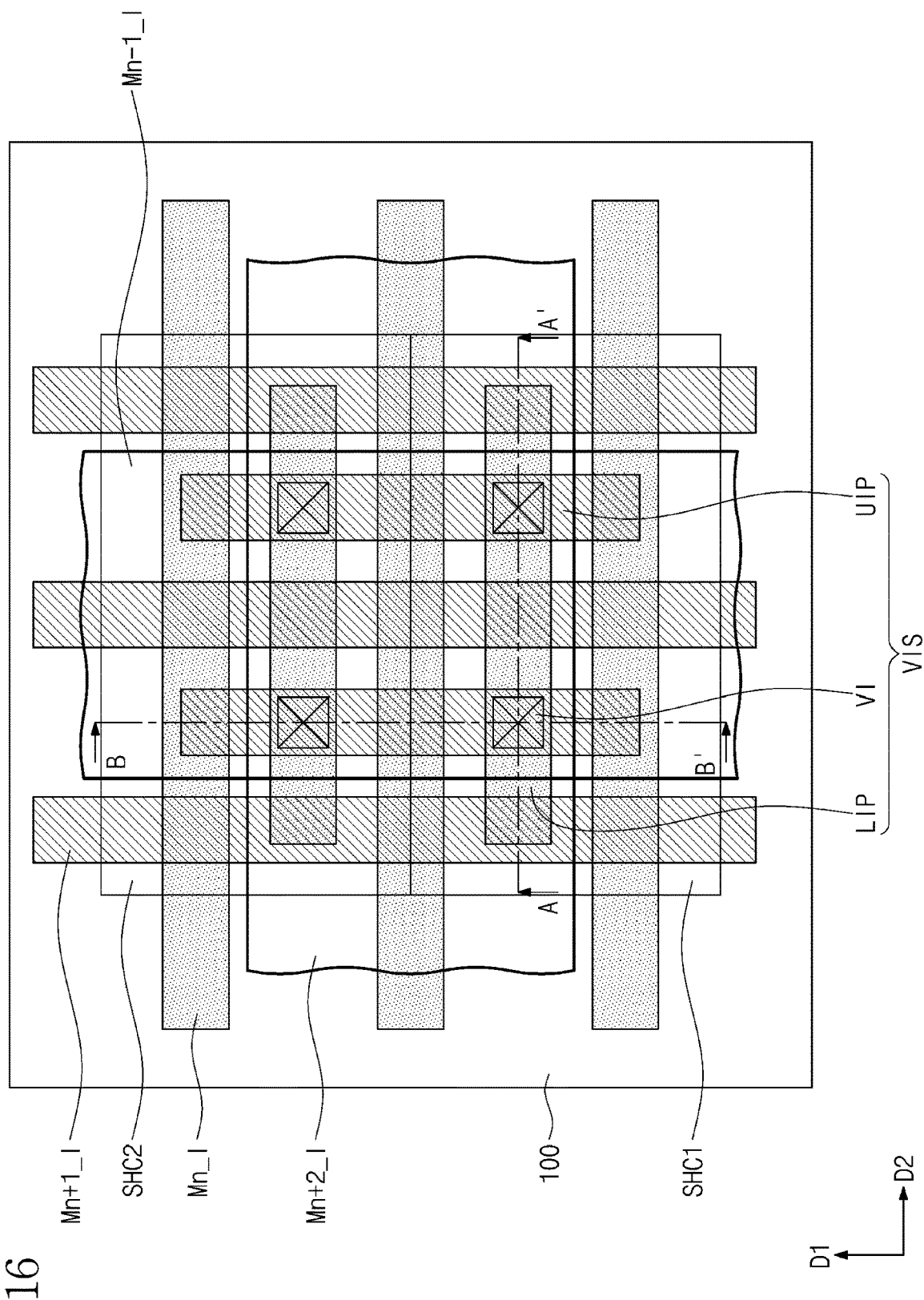
FIG. 16 is a plan view of a semiconductor device according to an example embodiment.
Figure 17A:
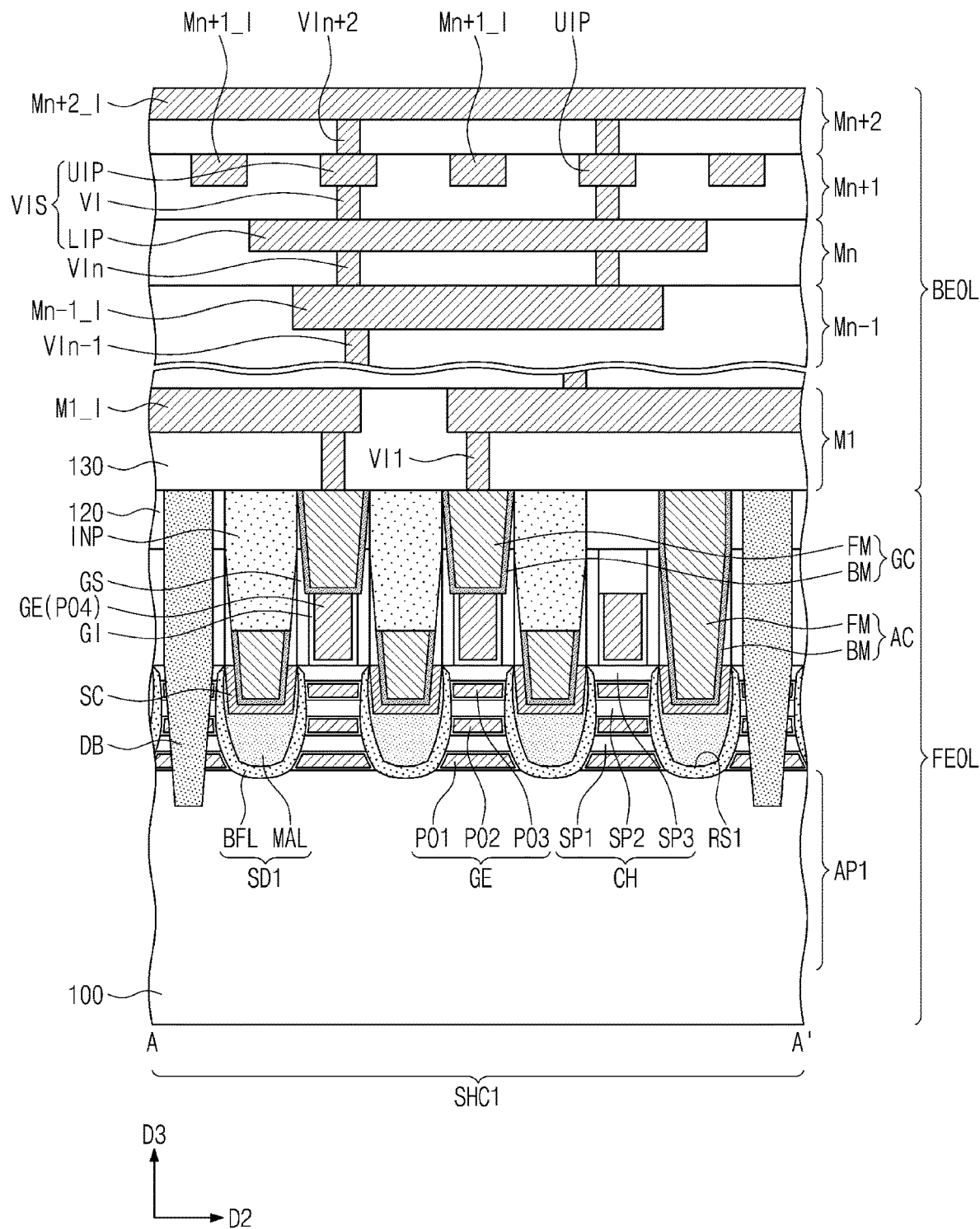
FIGS. 17A and 17B are cross-sectional views respectively taken along lines A-A' and B-B' of FIG. 16, according to an example embodiment.
Figure 17B:
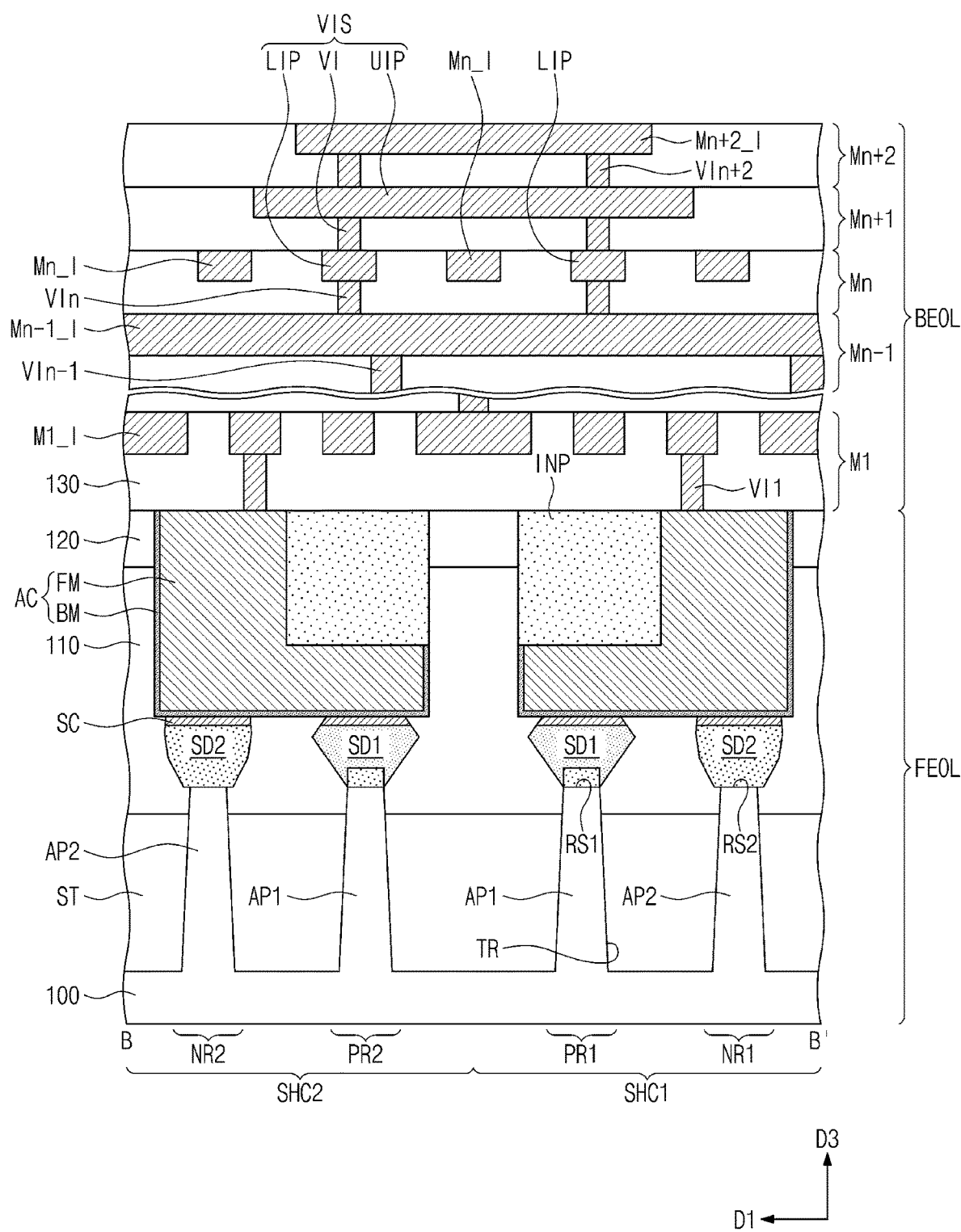

An OPC step may be performed on a layout of FIG. 15 that has undergone the routing step. A photomask may be generated based on the corrected layout (operation S50 of FIG. 2). The generated photomask may be used to manufacture a semiconductor device on a substrate (operation S60 of FIG. 2). With reference to FIGS. 16, 17A, and 17B, the following will describe by way of example a semiconductor device manufactured based on the layout of FIG. 15 on a substrate.

FIG. 16 is a plan view of a semiconductor device according to an example embodiment. FIGS. 17A and 17B are cross-sectional views respectively taken along lines A-A' and B-B' of FIG. 16, according to an example embodiment. FIGS. 16, 17A, and 17B exemplarily show a semiconductor device actually achieved on a substrate by using the layout of FIG. 15 that has undergone the routing step.

Referring to FIGS. 16, 17A, and 17B, a front-end-of-line (FEOL) layer may be provided on a substrate 100. For example, first and second single height cells SHC1 and SHC2 may be provided. Each of the first and second single height cells SHC1 and SHC2 may include logic transistors included in a logic circuit. The first and second single height cells SHC1 and SHC2 may correspond to standard cells disposed by the standard cell placement operation S31 of FIG. 2.

The substrate 100 may be a compound semiconductor substrate or a semiconductor substrate including silicon, germanium, or silicon-germanium. For example, the substrate 100 may be a silicon substrate.

The substrate 100 may have a first p-type MOS field-effect transistor (FET) (PMOSFET) region PR1, a second PMOSFET region PR2, a first n-type MOSFET (NMOSFET) region NR1, and a second NMOSFET region NR2. Each of the first and second PMOSFET and NMOSFET regions PR1, PR2, NR1, and NR2 may extend in a second direction D2. The first single height cell SHC1 may include the first NMOSFET region NR1 and the first PMOSFET region PR1, and the second single height cell SHC2 may include the second PMOSFET region PR2 and the second NMOSFET region NR2.

A first active pattern AP1 and a second active pattern AP2 may be defined by a trench TR formed on an upper portion of the substrate 100. The first active pattern AP1 may be provided on each of the first and second PMOSFET regions PR1 and PR2. The second active pattern AP2 may be provided on each of the first and second NMOSFET regions NR1 and NR2. The first and second active patterns AP1 and AP2 may extend in the second direction D2. The first and second active patterns AP1 and AP2 may be vertically protruding portions of the substrate 100.

The trench TR may be filled with a device isolation layer ST. The device isolation layer ST may include a silicon oxide layer. The device isolation layer ST may not cover a channel pattern CH which will be discussed below.

A channel pattern CH may be provided on each of the first and second active patterns AP1 and AP2. The channel pattern CH may include a first semiconductor pattern SP1, a second semiconductor pattern SP2, and a third semiconductor pattern SP3 that are sequentially stacked. The first, second, and third semiconductor patterns SP1, SP2, and SP3 may be spaced apart from each other in a vertical direction or a third direction D3.

Each of the first, second, and third semiconductor patterns SP1, SP2, and SP3 may include one or more of silicon (Si), germanium (Ge), and silicon-germanium (SiGe). For example, each of the first, second, and third semiconductor patterns SP1, SP2, and SP3 may include crystalline silicon.

A plurality of first source/drain patterns SD1 may be provided on the first active pattern AP1. A plurality of first recesses RS1 may be formed on an upper portion of the first active pattern AP1. First source/drain patterns SD1 may be provided in corresponding first recesses RS1. The first source/drain patterns SD1 may be impurity regions having a first conductivity type (e.g., p-type). The channel pattern CH may be interposed between a pair of first source/drain patterns SD1. For example, the pair of first source/drain patterns SD1 may be connected to each other through the stacked first, second, and third semiconductor patterns SP1, SP2, and SP3.

A plurality of second source/drain patterns SD2 may be provided on the second active pattern AP2. A plurality of second recesses RS2 may be formed on an upper portion of the second active pattern AP2. Second source/drain patterns SD2 may be provided in corresponding second recesses RS2. The second source/drain patterns SD2 may be impurity regions having a second conductivity type (e.g., n-type). The channel pattern CH may be interposed between a pair of second source/drain patterns SD2. For example, the pair of second source/drain patterns SD2 may be connected to each other through the stacked first, second, and third semiconductor patterns SP1, SP2, and SP3.

The first and second source/drain patterns SD1 and SD2 may be epitaxial patterns formed by a selective epitaxial growth (SEG) process. For example, each of the first and second source/drain patterns SD1 and SD2 may have a top surface higher than that of the third semiconductor pattern SP3. For another example, at least one selected from the first and second source/drain patterns SD1 and SD2 may have a top surface at substantially the same level as that of a top surface of the third semiconductor pattern SP3.

The first source/drain patterns SD1 may include a semiconductor element (e.g., SiGe) whose lattice constant is greater than that of a semiconductor element of the substrate 100. The first source/drain patterns SD1 may therefore provide the channel pattern CH with a compressive stress. The second source/drain patterns SD2 may include the same semiconductor element (e.g., Si) as that of the substrate 100.

Gate electrodes GE may be provided to extend in the first direction D1, while running across the channel patterns CH. The gate electrodes GE may be arranged in the second direction D2. The gate electrodes GE may vertically overlap corresponding channel patterns CH.

The gate electrode GE may include a first portion PO1 interposed between the first semiconductor pattern SP1 and one of the first and second active patterns AP1 and AP2, a second portion PO2 interposed between the first semiconductor pattern SP1 and the second semiconductor pattern SP2, a third portion PO3 interposed between the second semiconductor pattern SP2 and the third semiconductor pattern SP3, and a fourth portion PO4 on the third semiconductor pattern SP3. In this sense, a transistor according to the present embodiment may be a three-dimensional field effect transistor (e.g., multi-bridge channel FET (MBCFET) or gate-all-around FET (GAAFET)) in which the gate electrode GE three-dimensionally surrounds the first and second channel patterns CH1 and CH2.

A pair of gate spacers GS may be disposed on opposite sidewalls of the fourth portion PO4 of the gate electrode GE. The gate spacers GS may extend in the first direction D1 along the gate electrode GE. The gate spacers GS may have their top surfaces higher than that of the gate electrode GE. The top surfaces of the gate spacers GS may be coplanar with that of a first interlayer dielectric layer 110 which will be discussed below. For example, the gate spacers GS may include at least one selected from SiCN, SiCON, and SiN. Additionally, the gate spacers GS may include a multi-layer formed of two or more of SiCN, SiCON, and SiN.

A gate capping pattern GP may be provided on the gate electrode GE. The gate capping pattern GP may extend in the first direction D1 along the gate electrode GE. The gate capping pattern GP may include a material having an etch selectivity with respect to first and second interlayer dielectric layers 110 and 120 which will be discussed below. For example, the gate capping pattern GP may include at least one selected from SiON, SiCN, SiCON, and SiN.

A gate dielectric layer GI may be interposed between the gate electrode GE and the channel pattern CH. The gate dielectric layer GI may surround each of the first, second, and third semiconductor patterns SP1, SP2, and SP3. In an embodiment of the present disclosure, the gate dielectric layer GI may include one or more of a silicon oxide layer, a silicon oxynitride layer, and a high-k dielectric layer. The high-k dielectric layer may include a high-k dielectric material whose dielectric constant is greater than that of a silicon oxide layer.

The gate electrode GE may include a first metal pattern and a second metal pattern on the first metal pattern. The first metal pattern may be provided on the gate dielectric layer GI to be adjacent to the first, second, and third semiconductor patterns SP1, SP2, and SP3. The first metal pattern may include a work-function metal that controls a threshold voltage of a transistor. A thickness and composition of the first metal pattern may be adjusted to achieve a desired threshold voltage of a transistor. For example, the first, second, and third portions PO1, PO2, and PO3 of the gate electrode GE may be formed of the first metal pattern or a work-function metal.

The first metal pattern may include a metal nitride layer. For example, the first metal pattern may include nitrogen (N) and at least one metal selected from titanium (Ti), tantalum (Ta), aluminum (Al), tungsten (W), and molybdenum (Mo). In addition, the first metal pattern may further include carbon (C). The first metal pattern may include a plurality of stacked work-function metal layers.

The second metal pattern may include metal whose resistance is less than that of the first metal pattern. For example, the second metal pattern may include at least one metal selected from tungsten (W), aluminum (Al), titanium (Ti), and tantalum (Ta). For example, the fourth portion PO4 of the gate electrode GE may include the first metal pattern and the second metal pattern on the first metal pattern.

A first interlayer dielectric layer 110 may be provided on the substrate 100. The first interlayer dielectric layer 110 may cover the gate spacers GS and the first and second source/drain patterns SD1 and SD2. The first interlayer dielectric layer 110 may have a top surface substantially coplanar with that of the gate capping pattern GP and that of the gate spacer GS. The first interlayer dielectric layer 110 may be provided thereon with a second interlayer dielectric layer 120 that covers the gate capping pattern GP.

Each of the first and second single height cells SHC1 and SHC2 may be provided on its opposite sides with a pair of separation structures DB that are opposite to each other in the second direction D2. The separation structure DB may extend in the first direction D1 parallel to the gate electrodes GE. The separation structure DB may electrically separate an active region of each of the first and second single height cells SHC1 and SHC2 from an active region of another cell.

Active contacts AC may be provided which penetrate the first and second interlayer dielectric layers 110 and 120 and correspondingly electrically connect to the first and second source/drain patterns SD1 and SD2. A pair of active contacts AC may be provided on opposite sides of the gate electrode GE. When viewed in plan, the active contact AC may have a bar shape that extends in the first direction D1.

The active contact AC may be a self-aligned contact. For example, the gate capping pattern GP and the gate spacer GS may be used to form the active contact AC in a self-alignment manner. For example, the active contact AC may cover at least a portion of a sidewall of the gate spacer GS. Although not shown, the active contact AC may cover a portion of the top surface of the gate capping pattern GP.

A metal-semiconductor compound layer SC, such as a silicide layer, may be interposed between the active contact AC and the first source/drain pattern SD1 and between the active contact AC and the second source/drain pattern SD2. The active contact AC may be electrically connected through the metal-semiconductor compound layer SC to one of the first and second source/drain patterns SD1 and SD2. For example, the metal-semiconductor compound layer SC may include at least one selected from titanium silicide, tantalum silicide, tungsten silicide, nickel silicide, and cobalt silicide.

Gate contacts GC may be provided which penetrate the second interlayer dielectric layer 120 and the gate capping pattern GP and electrically connect to corresponding gate electrodes GE. In an embodiment of the present disclosure, referring to FIG. 17A, the active contact AC may have an upper portion adjacent to the gate contact GC, and the upper portion of the active contact AC may be filled with an upper dielectric pattern INP. The upper dielectric pattern INP may have a bottom surface lower than that of the gate contact GC. For example, the upper dielectric pattern INP may cause the active contact AC adjacent to the gate contact GC to have a top surface lower than the bottom surface of the gate contact GC. Therefore, it may be possible to prevent a short circuit resulting from contact between the gate contact GC and its adjacent active contact AC.

Each of the active contact AC and the gate contact GC may include a barrier metal BM and a fill metal FM on the barrier metal BM. The barrier metal BM may surround a surface of the fill metal FM except a top surface of the fill metal FM. For example, the fill metal FM may include at least one selected from tungsten, copper, aluminum, molybdenum, ruthenium, cobalt, and vanadium. The barrier metal BM may include a metal nitride layer. The metal nitride layer may include at least one selected from a titanium nitride (TiN) layer, a tantalum nitride (TaN) layer, a tungsten nitride (WN) layer, a nickel nitride (NiN) layer, a cobalt nitride (CoN) layer, and a platinum nitride (PtN) layer.

A BEOL layer may be provided on the FEOL layer. The BEOL layer may include a plurality of metal layers M1, Mn−1, Mn, Mn+1, and Mn+2. The subscript may be an integer equal to or greater than 3.

The M1 layer may include M1 lines M1_I. The M1 lines M1_I may be directly connected to the FEOL layer. For example, each of the M1 lines M1_I may be connected through a V1 via VI1 to a corresponding one of the active and gate contacts AC and GC.

The Mn−1 layer may include an Mn−1 line Mn−1_I and a Vn−1 via Vin−1. For example, the Mn−1 layer may be an M3 layer. The Mn−1 line Mn−1_I may correspond to the low-level line ML_I of FIG. 15. The Mn−1 line Mn−1_I may extend in the first direction D1. The Vn−1 via VIn−1 may be provided beneath the Mn−1 line Mn−1_I.

The Mn layer may include Mn lines Mn_I and lower line patterns LIP. For example, the Mn layer may be an M4 layer. The Mn lines Mn_I may correspond to the lower lines LIL of FIG. 15. The lower line patterns LIP may correspond to the first and second lower line patterns LIP1 and LIP2 of the via structure VIS depicted in FIG. 15. Neighboring lower line patterns LIP may be provided therebetween with the Mn line Mn_I, or a routing line (see FIG. 17B). The lower line patterns LIP of the via structure VIS may be connected through Vn vias VIn to the Mn−1 line Mn−1_I.

The Mn+1 layer may include Mn+1 lines Mn+1_I and upper line patterns UIP. For example, the Mn+1 layer may be an M5 layer. The Mn+1 lines Mn+1_I may correspond to the upper lines UIL of FIG. 15. The upper line patterns UIP may correspond to the first and second upper line patterns UIP1 and UIP2 of the via structure VIS depicted in FIG. 15. Neighboring upper line patterns UIP may be provided therebetween with the Mn+1 line Mn+1_I, or a routing line (see FIG. 17A). The upper line patterns UIP of the via structure VIS may be connected through Vn+1 vias VIn+1 to the lower line patterns LIP.

The Mn+2 layer may include an Mn+2 line Mn+2_I and Vn+2 vias VIn+2. For example, the Mn+2 layer may be an M6 layer. The Mn+2 line Mn+2_I may correspond to the high-level line MU_I of FIG. 15. The Mn+2 line Mn+2_I may extend in the second direction D2. The Vn+2 vias Vn+2_I may be provided beneath the Mn+2 line Mn+2_I. The Mn+2 line Mn+2_I may be connected through the Vn+2 vias VIn+2 to the upper line patterns UIP of the via structure VIS.

A semiconductor device according to the present embodiment may be configured such that the Mn−1 line Mn−1_I and the Mn+2 line Mn+2_I may be vertically connected to each other through the via structure VIS. The via structure VIS may vertically transfer a power (e.g., VDD or VSS) or a signal between the Mn−1 line Mn−1_I and the Mn+2 line Mn+2_I. A semiconductor device according to the present embodiment may include a routing line that extends while penetrating the via structure VIS, which routing line may include the Mn+1 line Mn+1_I between the upper line patterns UIP and the Mn line Mn_I between the lower line patterns LIP. Therefore, a semiconductor device according to the present embodiment may have the increased degree of routing freedom and the high integration.

In a method of fabricating and designing a semiconductor device according to the present disclosure, it may be possible to promptly and effectively perform a routing step by using a via structure that can increase the number of routing tracks. Information in a technology file of the routing tool may be used to generate a unit via structure of 1×1, and a mesh-shape via structure may be generated by arranging the unit via structures in a matrix fashion. The generated X×Y structure may be stored in the routing tool. Afterwards, the via structure may be disposed on a desired position in the routing step in which the routing tool is used. The present disclosure may increase the degree of routing freedom and improve integration of a device.

At least one of the components, elements, modules or units (collectively "components" in this paragraph) represented by a block in the drawings such as FIG. 1 may be embodied as various numbers of hardware, software and/or firmware structures that execute respective functions described above. At least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a CPU that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

Although some embodiments of disclosure have been discussed with reference to accompanying figures, it will be understood that various changes in form and details may be made therein without departing from the spirit and scope of the disclosure. It therefore will be understood that the embodiments described above are just illustrative but not limitative in all aspects.

What is claimed is:

1. A method of fabricating a semiconductor device, the method comprising:
   generating and storing an X×Y via structure in a routing tool, each of X and each of Y being an integer;
   providing a low-level line and a high-level line;
   providing the X×Y via structure on a region where the low-level line and the high-level line overlap; and
   providing at least one routing line that passes through the X×Y via structure,
   wherein the generating the X×Y via structure comprises:
      generating a unit via structure, the unit via structure comprising:
         a lower line pattern extending in a first lateral direction;
         an upper line pattern extending in a second lateral direction that is perpendicular to the first lateral direction; and
         a via where the lower line pattern and the upper line pattern overlap; and
      providing a plurality of the unit via structures in an X×Y matrix around a via origin.

2. The method of claim 1, wherein generating the X×Y via structure comprises:
   merging the plurality of unit via structures that are provided in the X×Y matrix.

3. The method of claim 2, wherein, in the unit via structure:
   the lower line pattern comprises a lower line pattern of an Mn layer;
   the upper line pattern comprises an upper line pattern of an Mn+1 layer; and
   the via comprises a Vn+1 via on a region where the lower line pattern and the upper line pattern overlap, and
   wherein n is an integer between 1 and 20.

4. The method of claim 3, wherein the generating the unit via structure is performed based on information about the Mn layer, the Mn+1 layer, and the Vn+1 via, the information being obtained from a technology file of the routing tool.

5. The method of claim 4, wherein an enclosure width and an overhang length of the lower line pattern are defined based on the information about the Mn layer.

6. The method of claim 4, wherein an enclosure width and an overhang length of the upper line pattern are defined based on the information about the Mn+1 layer.

7. The method of claim 3, wherein generating the X×Y via structure further comprises defining a plurality of lower line tracks of the Mn layer and a plurality of upper line tracks of the Mn+1 layer,
   wherein lower line patterns of the plurality of unit via structures are correspondingly provided on even-numbered lower line tracks of the plurality of lower line tracks, and
   wherein upper line patterns of the plurality of unit via structures are correspondingly provided on even-numbered upper line tracks of the plurality of upper line tracks.

8. The method of claim 7, wherein odd-numbered lower line tracks of the plurality of lower line tracks are configured as lower routing tracks,
   wherein the lower line patterns are not provided on the odd-numbered lower line tracks,
   wherein odd-numbered upper line tracks of the plurality of upper line tracks are configured as upper routing tracks, and
   wherein the upper line patterns are not provided on the odd-numbered upper line tracks.

9. The method of claim 1, wherein the X×Y via structure comprises:
   X number of upper line patterns that extend in the second lateral direction;
   Y number of lower line patterns that extend in the first lateral direction; and
   X×Y number of vias on corresponding points where the upper line patterns and the lower line patterns intersect.

10. The method of claim 1, further comprising:
    generating and storing the X×Y via structure in the routing tool;
    generating a plurality of via structures while changing each of X and Y; and
    storing the plurality of via structures in the routing tool.

11. A method of fabricating a semiconductor device, the method comprising:
   generating a unit via structure of 1×1 based on a technology file of a routing tool;
   generating an X×Y via structure by arranging a plurality of unit via structures in an X×Y matrix, each of X and Y being an integer;
   storing the X×Y via structure in the routing tool;
   providing a low-level line and a high-level line;
   retrieving the X×Y via structure stored in the routing tool; and
   providing the X×Y via structure on a region where the low-level line and the high-level line overlap,
   wherein the unit via structure comprises a lower line pattern extending in a first lateral direction, an upper line pattern extending in a second lateral direction that is perpendicular to the first lateral direction; and a via where the lower line pattern and the upper line pattern overlap, and
   wherein generating the X×Y via structure comprises arranging the plurality of unit via structures in an X×Y matrix around a via origin.

12. The method of claim 11, wherein, in the unit via structure:
   the lower line pattern comprises a lower line pattern of an Mn layer;
   the upper line pattern comprises an upper line pattern of an Mn+1 layer; and
   the via comprises a Vn+1 via on a region where the lower line pattern and the upper line pattern overlap, and
   wherein n is an integer between 1 and 20.

13. The method of claim 12, wherein the generating the unit via structure is performed based on information about the Mn layer, the Mn+1 layer, and the Vn+1 via, the information being obtained from the technology file of the routing tool.

14. The method of claim 12, wherein generating the X×Y via structure comprises:
   defining a plurality of lower line tracks of the Mn layer and a plurality of upper line tracks of the Mn+1 layer;
   providing lower line patterns of the plurality of unit via structures on corresponding even-numbered lower line tracks of the plurality of lower line tracks; and
   providing upper line patterns of the plurality of unit via structures on corresponding even-numbered upper line tracks of the plurality of upper line tracks.

15. The method of claim 14, wherein odd-numbered lower line tracks of the plurality of lower line tracks are configured as lower routing tracks,
   wherein the lower line patterns are not provided on the odd-numbered lower line tracks,
   wherein odd-numbered upper line tracks of the plurality of upper line tracks are configured as upper routing tracks, and
   wherein the upper line patterns are not provided on the odd-numbered upper line tracks.

16. A method of fabricating a semiconductor device, the method comprising:
   generating and storing an X×Y via structure in a routing tool, each of X and Y being an integer; and
   performing a routing step using the routing tool, and
   wherein generating the X×Y via structure comprises:
      generating a unit via structure of 1×1, the unit via structure comprising a lower line pattern extending in a first lateral direction, an upper line pattern extending in a second lateral direction that is perpendicular to the first lateral direction; and a via where the lower line pattern and the upper line pattern overlap;
      arranging a plurality of unit via structures in an X×Y matrix around a via origin; and
      emerging the plurality of unit via structures that are arranged in the X×Y matrix.

17. The method of claim 16, wherein the generating the unit via structure comprises:
   providing a via having a first width in the first lateral direction and a second width in the second lateral direction based on information in a technology file of the routing tool;
   providing a lower line pattern that overlaps the via and extends in the first lateral direction; and
   providing an upper line pattern that overlaps the via and extends in the second lateral direction.

18. The method of claim 17, wherein the information in the technology file of the routing tool is used to define a length in the first lateral direction of the lower line pattern and a width in the second lateral direction of the lower line pattern.

19. The method of claim 17, wherein the information in the technology file of the routing tool is used to define a length in the second lateral direction of the upper line pattern and a width in the first lateral direction of the upper line pattern.

20. The method of claim 16, wherein merging the plurality of unit via structures that are arranged in the X×Y matrix comprises merging the plurality of the unit via structures at first overlap regions where lower line patterns of the plurality of the unit via structures overlap and at second overlap regions where upper line patterns of the plurality of the unit via structures overlap.

* * * * *